US012809028B2

(12) United States Patent
Toledano et al.

(10) Patent No.: US 12,809,028 B2
(45) Date of Patent: *Nov. 24, 2026

(54) VEHICLE NAVIGATION BASED ON ALIGNED IMAGE AND LIDAR INFORMATION

(71) Applicant: Mobileye Vision Technologies Ltd., Jerusalem (IL)

(72) Inventors: Elad Toledano, Jerusalem (IL); Kevin Rosenblum, Jerusalem (IL); Erez Dagan, Tel Aviv (IL); Alon Ziv, Jerusalem (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/601,431

(22) Filed: Mar. 11, 2024

(65) Prior Publication Data

US 2024/0295655 A1 Sep. 5, 2024

Related U.S. Application Data

(63) Continuation of application No. 16/478,994, filed as application No. PCT/IB2018/000141 on Jan. 25, 2018, now Pat. No. 11,953,599.

(Continued)

(51) Int. Cl.
*G01S 17/86* (2020.01)
*G01S 17/48* (2006.01)
(Continued)

(52) U.S. Cl.
CPC .............. *G01S 17/86* (2020.01); *G01S 17/48* (2013.01); *G01S 17/931* (2020.01);
(Continued)

(58) Field of Classification Search
None
See application file for complete search history.

(56) References Cited

U.S. PATENT DOCUMENTS 9,221,396 B1 * 12/2015 Zhu ........................ G08G 1/163
2005/0134440 A1 6/2005 Breed
(Continued)

FOREIGN PATENT DOCUMENTS

CN 101698303 A 4/2010
CN 101975951 A 2/2011
(Continued)

OTHER PUBLICATIONS

Notice of Reexamination in Chinese Patent Application No. 201880008067.6 dated Jul. 31, 2024 (17 pages).
(Continued)

*Primary Examiner* — Shayne M. Gilbertson
(74) *Attorney, Agent, or Firm* — Finnegan, Henderson, Farabow, Garrett & Dunner LLP

(57) ABSTRACT

A navigational system for a host vehicle includes one processor programmed to: receive a stream of images captured by a camera onboard the host vehicle, wherein the captured images are representative of an environment surrounding the host vehicle; receive an output of a LIDAR onboard the host vehicle, wherein the output of the LIDAR is representative of laser reflections from a portion of the environment surrounding the host vehicle; determine one indicator of relative alignment between the output of the LIDAR and one image captured by the camera; attribute LIDAR reflection information to objects identified in the one image based on the one indicator of the relative alignment between the output of the LIDAR and the one image captured by the camera; and use the attributed LIDAR reflection information and the objects identified in the at (Continued)

least one image to determine one navigational characteristic associated with the host vehicle.

24 Claims, 25 Drawing Sheets

Related U.S. Application Data

(60) Provisional application No. 62/538,925, filed on Jul. 31, 2017, provisional application No. 62/450,750, filed on Jan. 26, 2017.

(51) Int. Cl.

| | |
|---|---|
| ***G01S 17/931*** | (2020.01) |
| ***G05D 1/00*** | (2024.01) |
| ***G05D 1/243*** | (2024.01) |
| ***G05D 1/247*** | (2024.01) |
| ***G05D 1/646*** | (2024.01) |

(52) U.S. Cl.

CPC ......... *G05D 1/0212* (2013.01); *G05D 1/0248* (2013.01); *G05D 1/0251* (2013.01); *G05D 1/2435* (2024.01); *G05D 1/247* (2024.01); *G05D 1/646* (2024.01)

(56) References Cited

U.S. PATENT DOCUMENTS

| | | | | |
|---|---|---|---|---|
| 2009/0312906 | A1 | 12/2009 | Bauer et al. | |
| 2010/0017046 | A1 | 1/2010 | Cheung et al. | |
| 2010/0017128 | A1* | 1/2010 | Zeng | G01S 13/865 342/70 |
| 2010/0182430 | A1* | 7/2010 | Kroepfl | G01S 17/86 348/148 |
| 2010/0235129 | A1 | 9/2010 | Sharma et al. | |
| 2012/0081544 | A1* | 4/2012 | Wee | G01S 17/894 348/140 |
| 2012/0293357 | A1* | 11/2012 | Nishigaki | G01S 17/931 342/52 |
| 2014/0118500 | A1* | 5/2014 | Liu | G06T 7/80 348/46 |
| 2014/0307247 | A1* | 10/2014 | Zhu | B60W 40/064 342/54 |
| 2015/0317781 | A1* | 11/2015 | Napier | G06T 7/85 348/46 |
| 2016/0162742 | A1* | 6/2016 | Rogan | G01S 7/4808 382/103 |
| 2016/0209211 | A1 | 7/2016 | Song et al. | |
| 2017/0008521 | A1 | 1/2017 | Braunstein et al. | |
| 2017/0061632 | A1* | 3/2017 | Lindner | G01S 17/86 |
| 2017/0108863 | A1* | 4/2017 | Chundrlik, Jr. | B60W 50/0205 |
| 2018/0025645 | A1* | 1/2018 | Schwindt | G08G 1/166 701/301 |
| 2018/0038961 | A1* | 2/2018 | Smits | G01S 17/48 |
| 2018/0067494 | A1* | 3/2018 | Schiffmann | G06T 7/70 |
| 2018/0183661 | A1* | 6/2018 | Wouhaybi | G01D 18/00 |
| 2018/0190046 | A1* | 7/2018 | Levinson | G01S 7/4972 |
| 2018/0203113 | A1* | 7/2018 | Taylor | G06T 7/11 |
| 2018/0203124 | A1* | 7/2018 | Izzat | G01S 17/89 |
| 2018/0316873 | A1* | 11/2018 | Wei | G08G 1/167 |
| 2019/0011927 | A1* | 1/2019 | Mou | G06V 20/56 |
| 2019/0147600 | A1* | 5/2019 | Karasev | G06V 10/764 382/107 |

FOREIGN PATENT DOCUMENTS

| | | | | |
|---|---|---|---|---|
| CN | 103198302 | A | 7/2013 | |
| CN | 103559791 | A | 2/2014 | |
| CN | 104035071 | A | 9/2014 | |
| CN | 105758426 | A | 7/2016 | |
| CN | 105818763 | A | 8/2016 | |
| EP | 2728376 | A1 * | 5/2014 | G01S 11/12 |
| JP | 2003-099784 | A | 4/2003 | |
| JP | 2005-258941 | A | 9/2005 | |
| JP | 2007-218738 | A | 8/2007 | |
| JP | 2007-303842 | A | 11/2007 | |
| JP | 2010-060299 | A | 3/2010 | |
| JP | 2012-080517 | A | 4/2012 | |
| JP | 2013-196401 | A | 9/2013 | |
| JP | 2016-034810 | A | 3/2016 | |
| JP | 2016-212630 | A | 12/2016 | |
| JP | 2018-535402 | | 11/2018 | |
| WO | 2013/084317 | | 6/2013 | |
| WO | 2013/145015 | | 10/2013 | |
| WO | PCT2016/088804 | | 7/2017 | |

OTHER PUBLICATIONS

Office Action issued in Chinese Application No. 201880008067.6 dated Oct. 8, 2022 (24 pages).

First Final Notice of Reasons for Rejection for Japanese Application No. 2022-161508 dated Jul. 4, 2023 (13 pages).

Second Office Action issued in counterpart Chinese Application No. 201880008067.6 dated Apr. 25, 2023 (15 pages).

Rejection Decision for Chinese Application No. 201880008067.6 dated Oct. 30, 2023 (21 pages).

Notice of Reasons for Rejection for Japanese Application No. 2022-161508 dated Nov. 7, 2023 (4 pages).

Office Action issued in Japanese Patent Application No. 2019-527816 dated Jan. 11, 2022 (9 pages).

International Search Report and Written Opinion in PCT/IB2018/000141, mailed May 18, 2018 (9 pages).

Extended European Search Report in Application No. 24186048.5-1206 / 441478 dated Oct. 15, 2024 (12 pages).

* cited by examiner

VEHICLE NAVIGATION BASED ON ALIGNED IMAGE AND LIDAR INFORMATION

CROSS REFERENCES TO RELATED APPLICATIONS

This application is a continuation of U.S. application Ser. No. 16/478,994, filed on Jul. 18, 2019, currently pending, which is a national stage entry of PCT International Application No. PCT/IB2018/000141, filed on Jan. 25, 2018, which claims the benefit of priority of U.S. Provisional Patent Application No. 62/450,750, filed on Jan. 26, 2017, and U.S. Provisional Patent Application No. 62/538,925, filed on Jul. 31, 2017. The foregoing applications are incorporated herein by reference in their entirety.

BACKGROUND

Technical Field

The present disclosure relates generally to autonomous vehicle navigation. Additionally, this disclosure relates to systems and methods for correlating LIDAR system output (e.g., particular laser reflections) with objects identified in one or more images captured by a camera onboard a vehicle.

Background Information

As technology continues to advance, the goal of a fully autonomous vehicle that is capable of navigating on roadways is on the horizon. Autonomous vehicles may need to take into account a variety of factors and make appropriate decisions based on those factors to safely and accurately reach an intended destination. For example, an autonomous vehicle may need to process and interpret visual information (e.g., information captured from a camera), information from radar or LIDAR, and may also use information obtained from other sources (e.g., from a GPS device, a speed sensor, an accelerometer, a suspension sensor, etc.). At the same time, in order to navigate to a destination, an autonomous vehicle may also need to identify its location within a particular roadway (e.g., a specific lane within a multi-lane road), navigate alongside other vehicles, avoid obstacles and pedestrians, observe traffic signals and signs, travel from one road to another road at appropriate intersections or interchanges, and respond to any other situation that occurs or develops during the vehicle's operation.

SUMMARY

Embodiments consistent with the present disclosure provide systems and methods for autonomous vehicle navigation. The disclosed embodiments may use cameras to provide autonomous vehicle navigation features. For example, consistent with the disclosed embodiments, the disclosed systems may include one, two, or more cameras that monitor the environment of a vehicle. The disclosed systems may provide a navigational response based on, for example, an analysis of images captured by one or more of the cameras. The navigational response may also take into account other data including, for example, global positioning system (GPS) data, sensor data (e.g., from an accelerometer, a speed sensor, a suspension sensor, etc.), and/or other map data.

Systems and methods are provided for navigating an autonomous vehicle. In one implementation, a navigational system for a host vehicle may include at least one processor programmed to: receive a stream of images captured by a camera onboard the host vehicle, wherein the captured images are representative of an environment surrounding the host vehicle; and receive an output of a LIDAR onboard the host vehicle, wherein the output of the LIDAR is representative of a plurality of laser reflections from at least a portion of the environment surrounding the host vehicle. The at least one processor may also be configured to determine at least one indicator of relative alignment between the output of the LIDAR and at least one image captured by the camera; attribute LIDAR reflection information to one or more objects identified in the at least one image based on the at least one indicator of the relative alignment between the output of the LIDAR and the at least one image captured by the camera; and use the attributed LIDAR reflection information and the one or more objects identified in the at least one image to determine at least one navigational characteristic associated with the host vehicle.

The disclosed embodiments may also include a vehicle comprising a body, a camera coupled to the body, a LIDAR coupled to the body, and at least one processor programmed to: receive a stream of images captured by the camera, wherein the captured images are representative of an environment surrounding the vehicle; receive an output of the LIDAR, wherein the output of the LIDAR is representative of a plurality of laser reflections from at least a portion of the environment surrounding the vehicle; determine at least one indicator of relative alignment between the output of the LIDAR and at least one image captured by the camera; attribute LIDAR reflection information to one or more objects identified in the at least one image based on the at least one indicator of the relative alignment between the output of the LIDAR and the at least one image captured by the camera; and use the attributed LIDAR reflection information and the one or more objects identified in the at least one image to determine at least one of an elevation associated with a road in an environment of the vehicle or a speed of the vehicle.

The disclosed embodiments may also include a method of autonomously navigating a host vehicle. The method may include: receiving a stream of images captured by a camera onboard the host vehicle, wherein the captured images are representative of an environment surrounding the host vehicle; receiving an output of a LIDAR onboard the host vehicle, wherein the output of the LIDAR is representative of a plurality of laser reflections from at least a portion of the environment surrounding the host vehicle; determining at least one indicator of relative alignment between the output of the LIDAR and at least one image captured by the camera; attributing LIDAR reflection information to one or more objects identified in the at least one image based on the at least one indicator of the relative alignment between the output of the LIDAR and the at least one image captured by the camera; and using the attributed LIDAR reflection information and the one or more objects identified in the at least one image to determine at least one navigational characteristic associated with the host vehicle.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
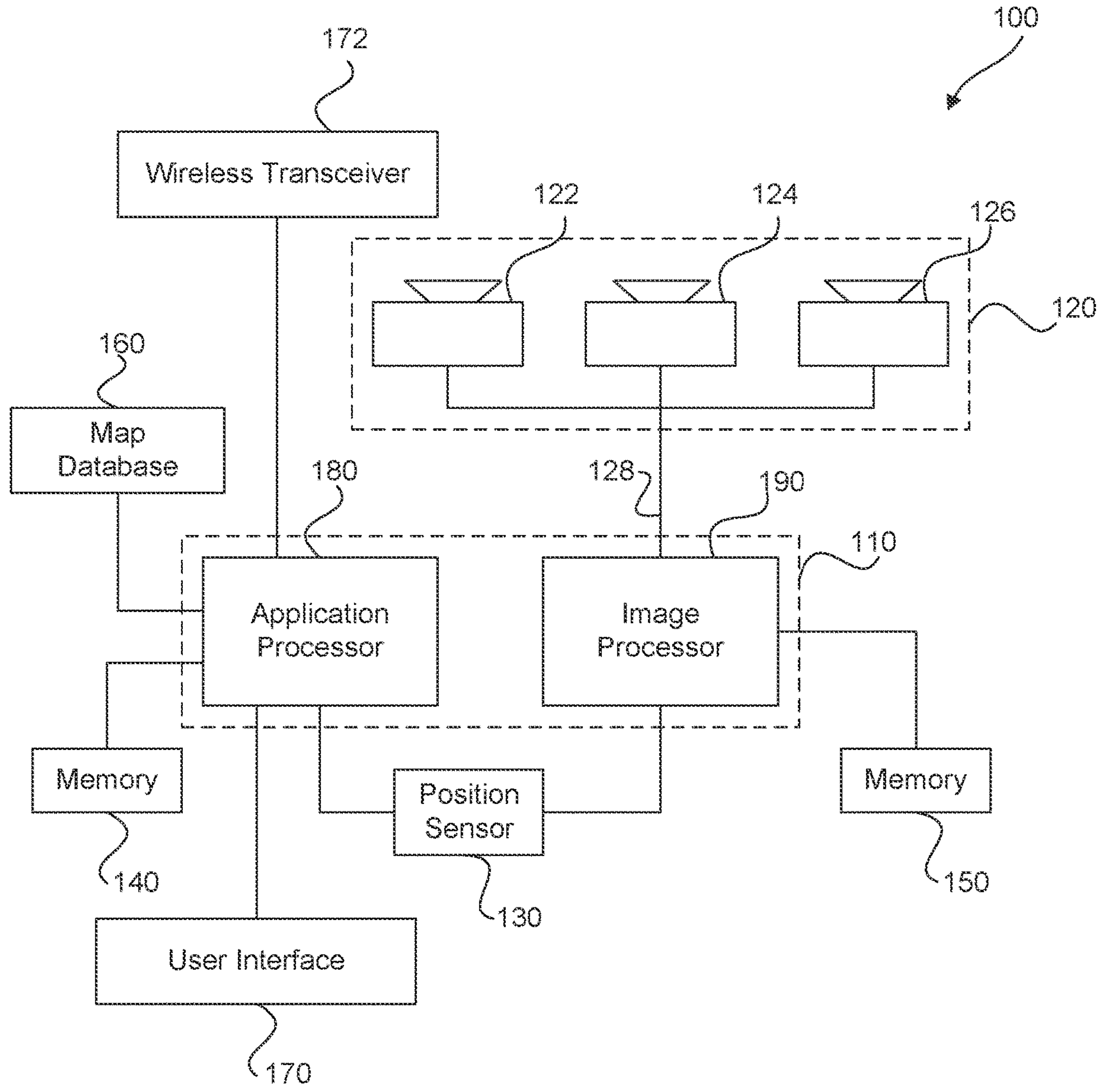
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Autonomous Vehicle Overview

As used throughout this disclosure, the term “autonomous vehicle” refers to a vehicle capable of implementing at least one navigational change without driver input. A “navigational change” refers to a change in one or more of steering, braking, or acceleration/deceleration of the vehicle. To be autonomous, a vehicle need not be fully automatic (e.g., fully operational without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects to the driver (e.g., braking or braking under certain circumstances). In some cases, autonomous vehicles may handle some or all aspects of braking, speed control, and/or steering of the vehicle.

As human drivers typically rely on visual cues and observations in order to control a vehicle, transportation infrastructures are built accordingly, with lane markings, traffic signs, and traffic lights designed to provide visual information to drivers. In view of these design characteristics of transportation infrastructures, an autonomous vehicle may include a camera and a processing unit that analyzes visual information captured from the environment of the vehicle. The visual information may include, for example, images representing components of the transportation infrastructure (e.g., lane markings, traffic signs, traffic lights, etc.) that are observable by drivers and other obstacles (e.g., other vehicles, pedestrians, debris, etc.). Additionally, an autonomous vehicle may also use stored information, such as information that provides a model of the vehicle’s environment when navigating. For example, the vehicle may use GPS data, sensor data (e.g., from an accelerometer, a speed sensor, a suspension sensor, etc.), and/or other map data to provide information related to its environment while it is traveling, and the vehicle (as well as other vehicles) may use the information to localize itself on the model. Some vehicles can also be capable of communication among them, sharing information, altering the peer vehicle of hazards or changes in the vehicles' surroundings, etc.

System Overview

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, a user interface 170, and a wireless transceiver 172. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras, CCDs, or any other type of image sensor), such as image capture device 122, image capture device 124, and image capture device 126. System 100 may also include a data interface 128 communicatively connecting processing unit 110 to image acquisition unit 120. For example, data interface 128 may include any wired and/or wireless link or links for transmitting image data acquired by image acquisition unit 120 to processing unit 110.

Wireless transceiver 172 may include one or more devices configured to exchange transmissions over an air interface to one or more networks (e.g., cellular, the Internet, etc.) by use of a radio frequency, infrared frequency, magnetic field, or an electric field. Wireless transceiver 172 may use any known standard to transmit and/or receive data (e.g., Wi-Fi, Bluetooth®, Bluetooth Smart, 802.15.4, ZigBee, etc.). Such transmissions can include communications from the host vehicle to one or more remotely located servers. Such transmissions may also include communications (one-way or two-way) between the host vehicle and one or more target vehicles in an environment of the host vehicle (e.g., to facilitate coordination of navigation of the host vehicle in view of or together with target vehicles in the environment of the host vehicle), or even a broadcast transmission to unspecified recipients in a vicinity of the transmitting vehicle.

Both applications processor 180 and image processor 190 may include various types of hardware-based processing devices. For example, either or both of applications processor 180 and image processor 190 may include a microprocessor, preprocessors (such as an image preprocessor), graphics processors, a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc. and may include various architectures (e.g., x86 processor, ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture consists of two floating point, hyper-thread 32-bit RISC CPUs (MIPS32® 34K® cores), five Vision Computing Engines (VCE), three Vector Microcode Processors (VMPR), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments. In other examples, the EyeQ4® and/or the the EyeQ5® may be used in the disclosed embodiments. Of course, any newer or future EyeQ processing devices may also be used together with the disclosed embodiments.

Any of the processing devices disclosed herein may be configured to perform certain functions. Configuring a processing device, such as any of the described EyeQ processors or other controller or microprocessor, to perform certain functions may include programming of computer executable instructions and making those instructions available to the processing device for execution during operation of the processing device. In some embodiments, configuring a processing device may include programming the processing device directly with architectural instructions. In other embodiments, configuring a processing device may include storing executable instructions on a memory that is accessible to the processing device during operation. For example, the processing device may access the memory to obtain and execute the stored instructions during operation. In either case, the processing device configured to perform the sensing, image analysis, and/or navigational functions disclosed herein represents a specialized hardware-based system in control of multiple hardware based components of a host vehicle.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices. Further, in some embodiments, system 100 may include one or more of processing unit 110 without including other components, such as image acquisition unit 120.

Processing unit 110 may comprise various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software, as well as a trained system, such as a neural network, or a deep neural network, for example. The memory units may include random access memory, read only memory, flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

In some embodiments, system 100 may include components such as a speed sensor (e.g., a speedometer) for measuring a speed of vehicle 200. System 100 may also include one or more accelerometers (either single axis or multiaxis) for measuring accelerations of vehicle 200 along one or more axes.

The memory units 140, 150 may include a database, or data organized in any other form, that indication a location of known landmarks. Sensory information (such as images, radar signal, depth information from lidar or stereo processing of two or more images) of the environment may be processed together with position information, such as a GPS coordinate, vehicle's ego motion, etc. to determine a current location of the vehicle relative to the known landmarks, and refine the vehicle location. Certain aspects of this technology are included in a localization technology known as REM™ which is being marketed by the assignee of the present application.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.). In some cases, map database 160 may store a sparse data model including polynomial representations of certain road features (e.g., lane markings) or target trajectories for the host vehicle. Map database 160 may also include stored representations of various recognized landmarks that may be used to determine or update a known position of the host vehicle with respect to a target trajectory. The landmark representations may include data fields such as landmark type, landmark location, among other potential identifiers.

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

One or more cameras (e.g., image capture devices 122, 124, and 126) may be part of a sensing block included on a vehicle. Various other sensors may be included in the sensing block, and any or all of the sensors may be relied upon to develop a sensed navigational state of the vehicle. In addition to cameras (forward, sideward, rearward, etc), other sensors such as RADAR, LIDAR, and acoustic sensors may be included in the sensing block. Additionally, the sensing block may include one or more components configured to communicate and transmit/receive information relating to the environment of the vehicle. For example, such components may include wireless transceivers (RF, etc.) that may receive from a source remotely located with respect to the host vehicle sensor based information or any other type of information relating to the environment of the host vehicle. Such information may include sensor output information, or related information, received from vehicle systems other than the host vehicle. In some embodiments, such information may include information received from a remote computing device, a centralized server, etc. Furthermore, the cameras may take on many different configurations: single camera units, multiple cameras, camera clusters, long FOV, short FOV, wide angle, fisheye, etc.

Figure 2A:
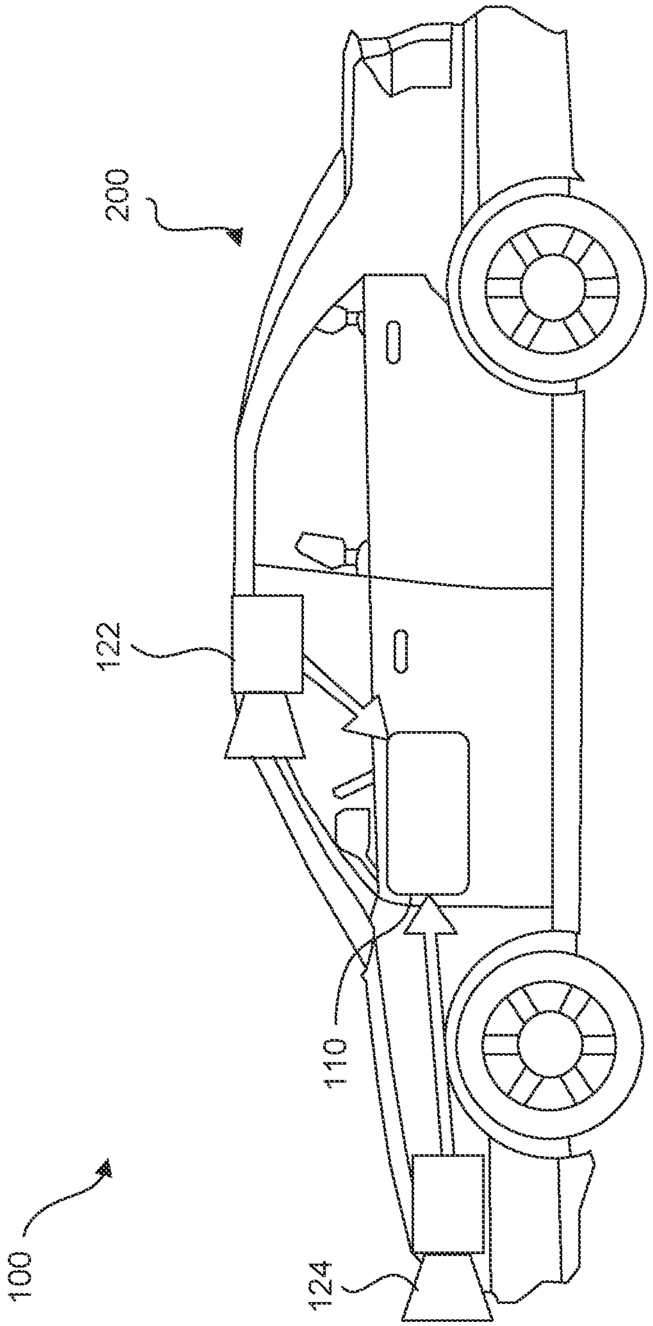
FIG. 2A is a diagrammatic side view representation of an exemplary vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light fixtures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

As discussed earlier, wireless transceiver 172 may and/or receive data over one or more networks (e.g., cellular networks, the Internet, etc.). For example, wireless transceiver 172 may upload data collected by system 100 to one or more servers, and download data from the one or more servers. Via wireless transceiver 172, system 100 may receive, for example, periodic or on demand updates to data stored in map database 160, memory 140, and/or memory 150. Similarly, wireless transceiver 172 may upload any data (e.g., images captured by image acquisition unit 120, data received by position sensor 130 or other sensors, vehicle control systems, etc.) from system 100 and/or any data processed by processing unit 110 to the one or more servers.

System 100 may upload data to a server (e.g., to the cloud) based on a privacy level setting. For example, system 100 may implement privacy level settings to regulate or limit the types of data (including metadata) sent to the server that may uniquely identify a vehicle and or driver/owner of a vehicle. Such settings may be set by user via, for example, wireless transceiver 172, be initialized by factory default settings, or by data received by wireless transceiver 172.

In some embodiments, system 100 may upload data according to a "high" privacy level, and under setting a setting, system 100 may transmit data (e.g., location information related to a route, captured images, etc.) without any details about the specific vehicle and/or driver/owner. For example, when uploading data according to a "high" privacy setting, system 100 may not include a vehicle identification number (VIN) or a name of a driver or owner of the vehicle, and may instead transmit data, such as captured images and/or limited location information related to a route.

Other privacy levels are contemplated as well. For example, system 100 may transmit data to a server according to an "intermediate" privacy level and include additional information not included under a "high" privacy level, such as a make and/or model of a vehicle and/or a vehicle type (e.g., a passenger vehicle, sport utility vehicle, truck, etc.). In some embodiments, system 100 may upload data according to a "low" privacy level. Under a "low" privacy level setting, system 100 may upload data and include information sufficient to uniquely identify a specific vehicle, owner/driver, and/or a portion or entirely of a route traveled by the vehicle. Such "low" privacy level data may include one or more of, for example, a VIN, a driver/owner name, an origination point of a vehicle prior to departure, an intended destination of the vehicle, a make and/or model of the vehicle, a type of the vehicle, etc.

Figure 2B:
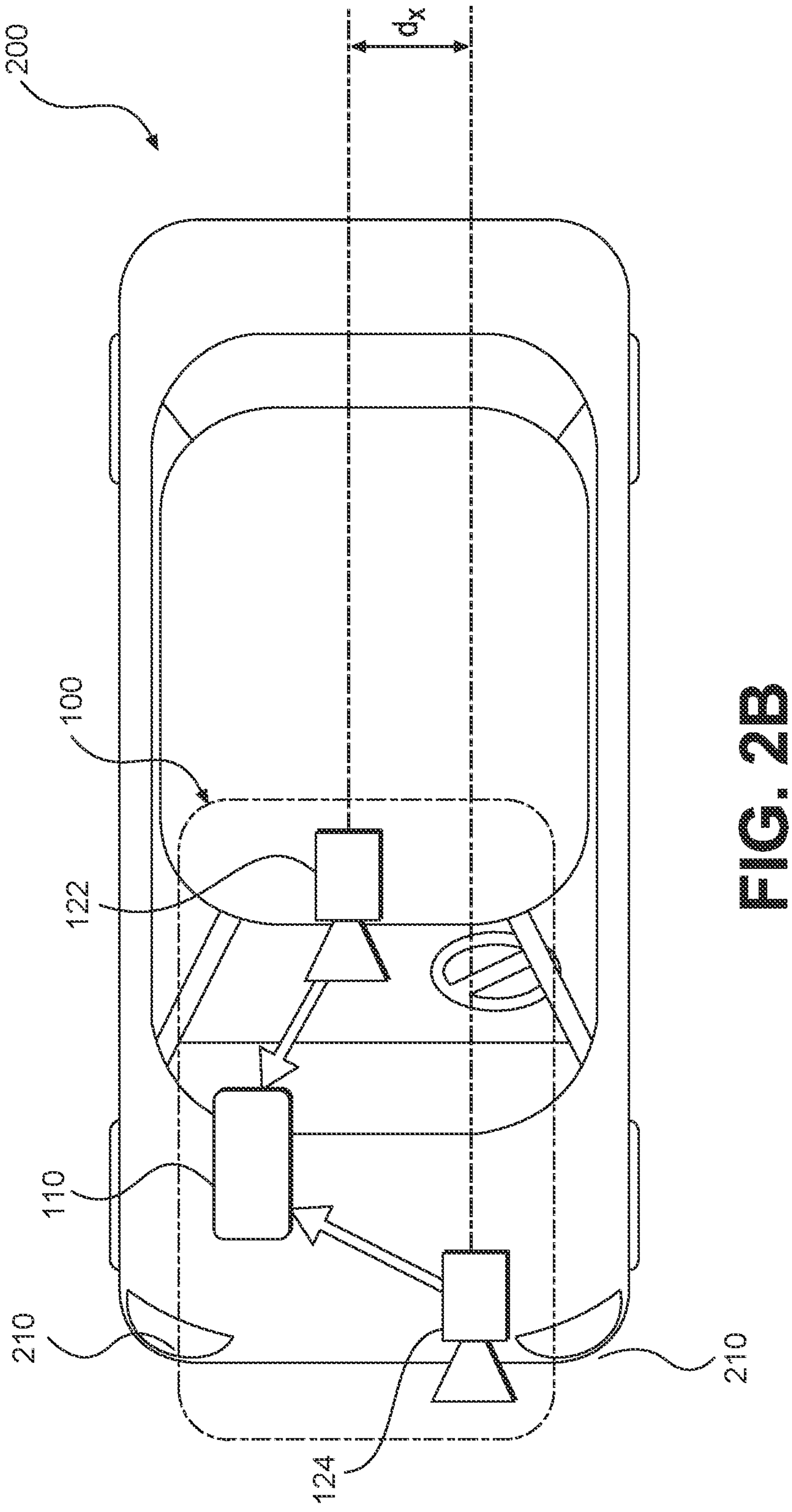
FIG. 2B is a diagrammatic top view representation of the vehicle and system shown in FIG. 2A consistent with the disclosed embodiments.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
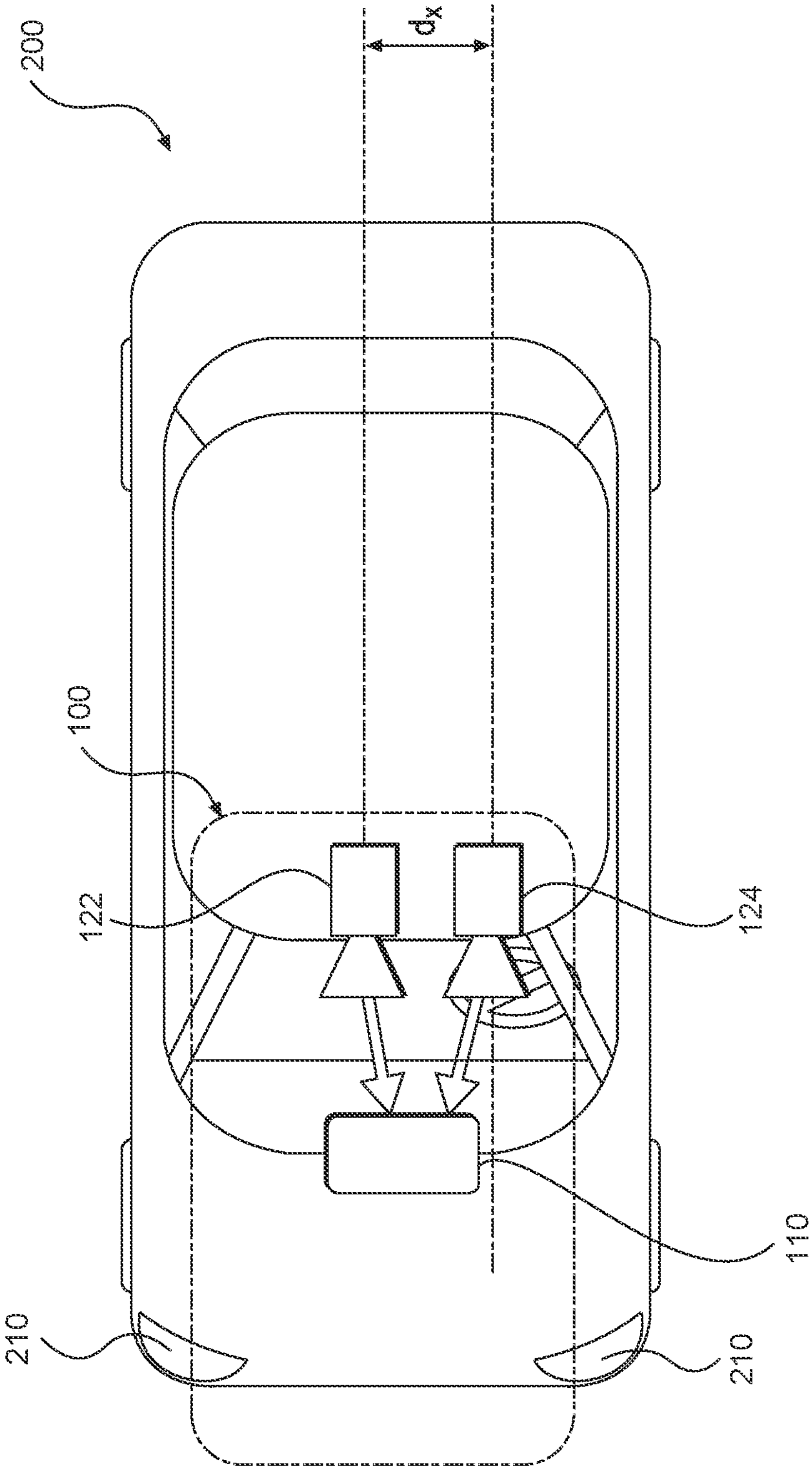
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
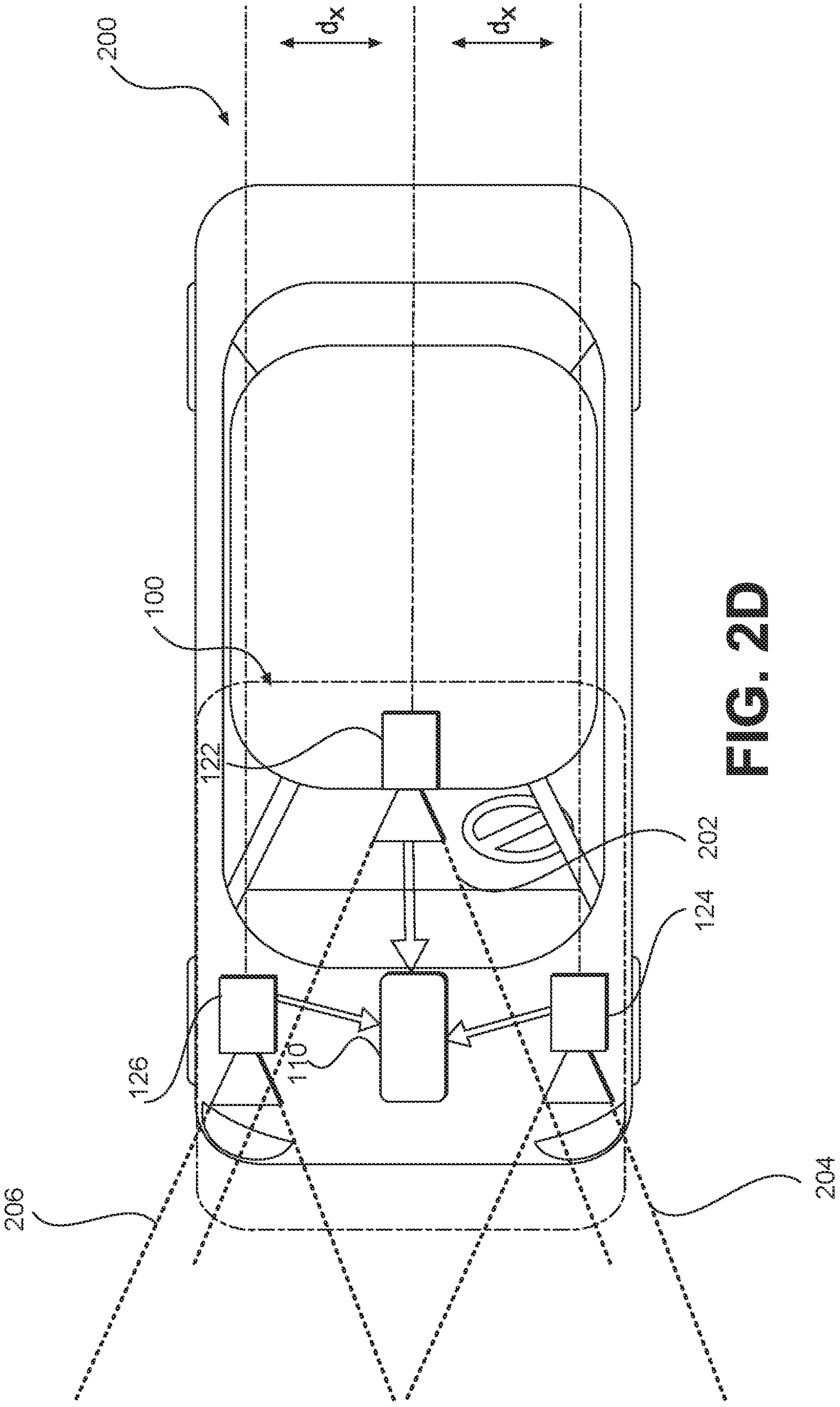
FIG. 2D is a diagrammatic top view representation of yet another embodiment of a vehicle including a system consistent with the disclosed embodiments.
Figure 2E:
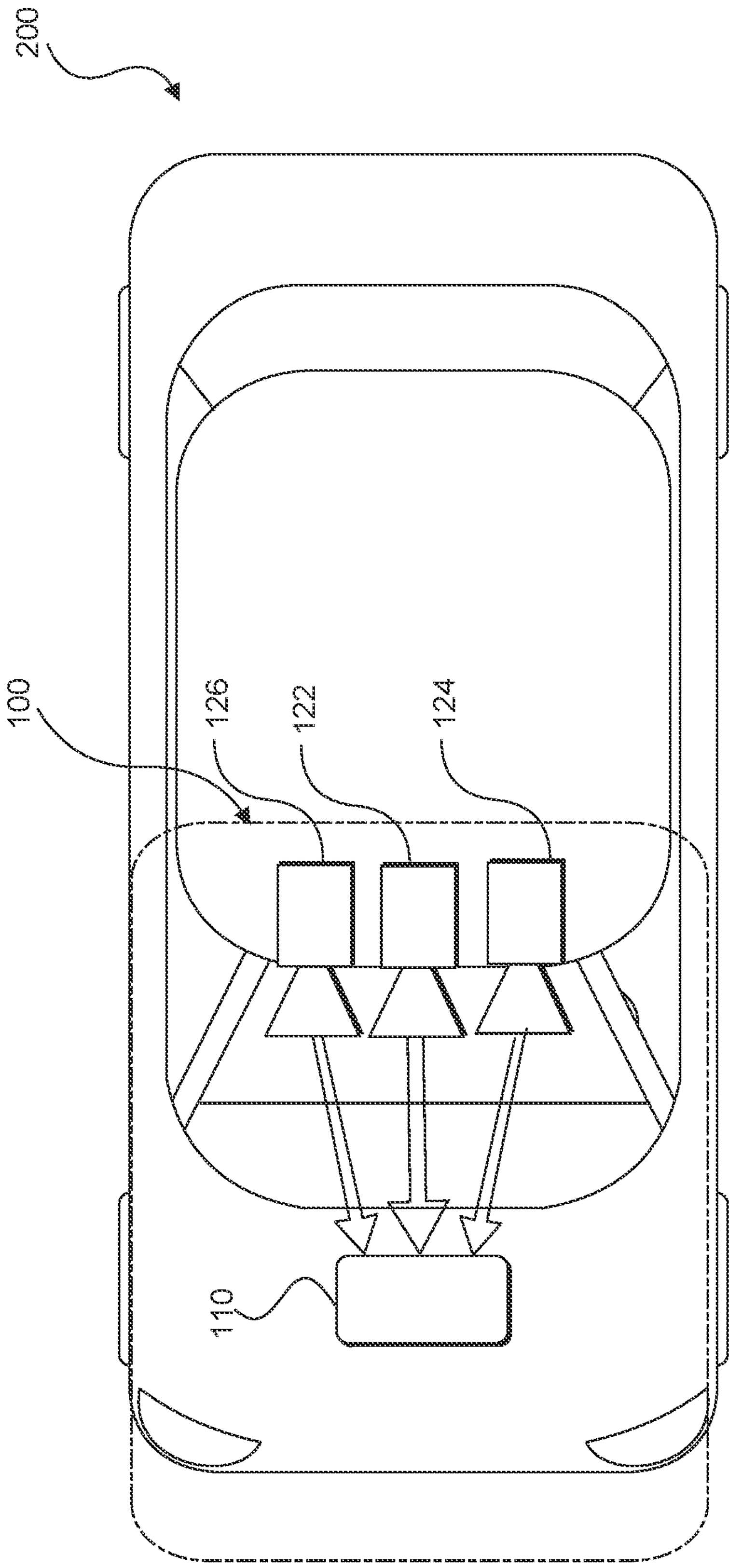
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees. In some embodiments, image capture device 122 may include a wide angle bumper camera or one with up to a 180 degree FOV. In some embodiments, image capture device 122 may be a 7.2M pixel image capture device with an aspect ratio of about 2:1 (e.g., H×V=3800×1900 pixels) with about 100 degree horizontal FOV. Such an image capture device may be used in place of a three image capture device configuration. Due to significant lens distortion, the vertical FOV of such an image capture device may be significantly less than 50 degrees in implementations in which the image capture device uses a radially symmetric lens. For example, such a lens may not be radially symmetric which would allow for a vertical FOV greater than 50 degrees with 100 degree horizontal FOV.

The first image capture device 122 may acquire a plurality of first images relative to a scene associated with vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

In some embodiments, one or more of the image capture devices (e.g., image capture devices 122, 124, and 126) disclosed herein may constitute a high resolution imager and may have a resolution greater than 5 M pixel, 7 M pixel, 10 M pixel, or greater.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by dx, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280×960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV device 122.

Figure 2F:
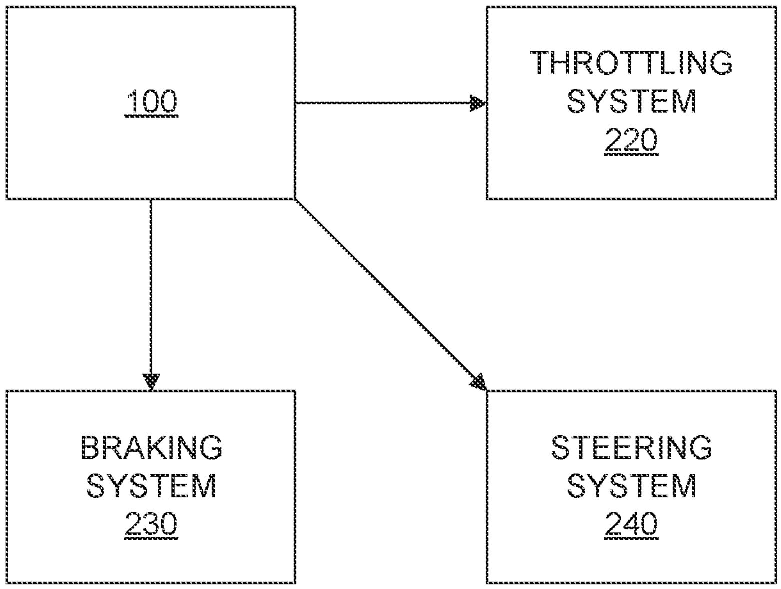
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 24 indicating operating conditions of vehicle 200 (e.g., speed, whether vehicle 200 is braking and/or turning, etc.). Further details are provided in connection with FIGS. 4-7, below.

Figure 3A:
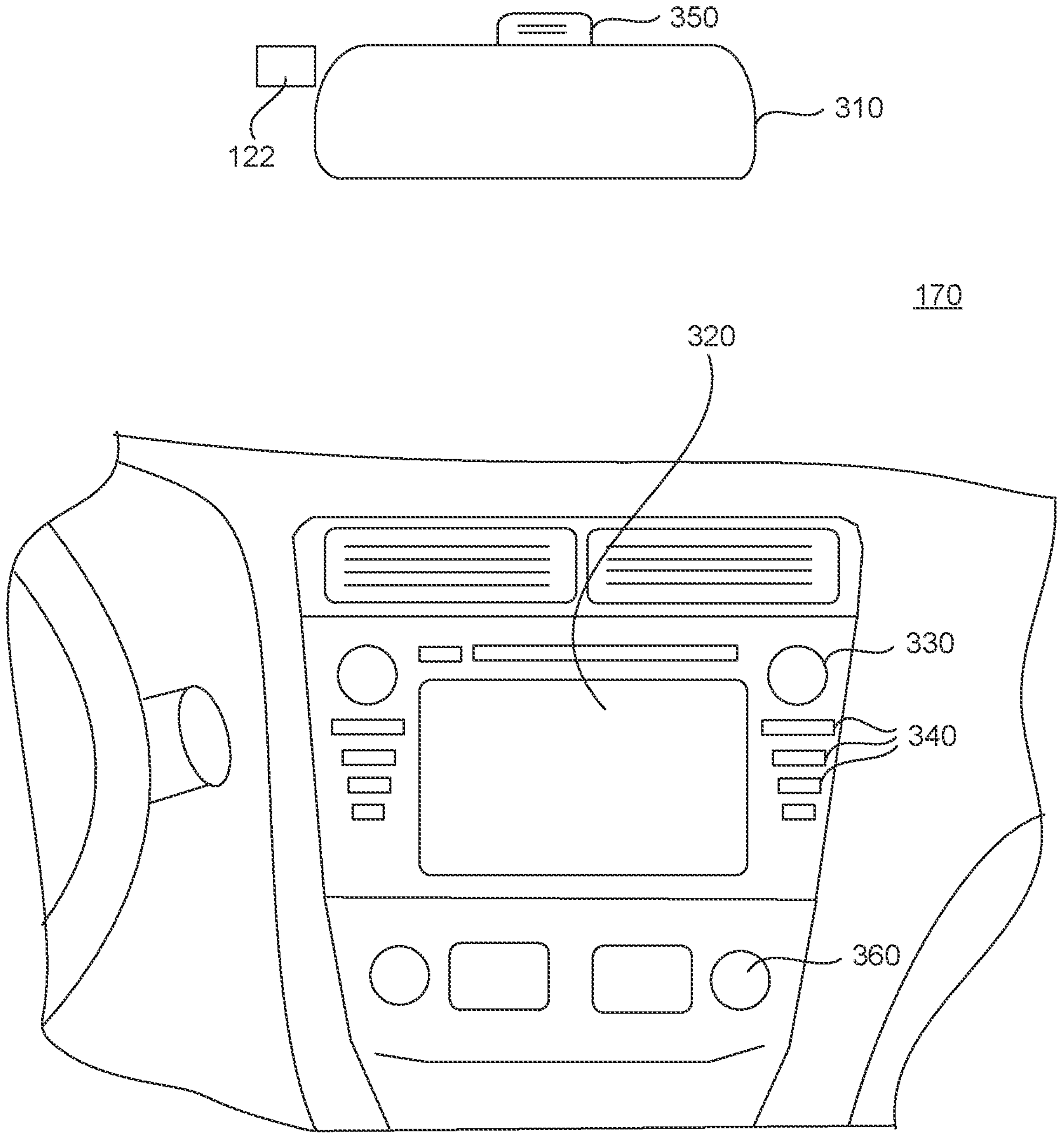
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
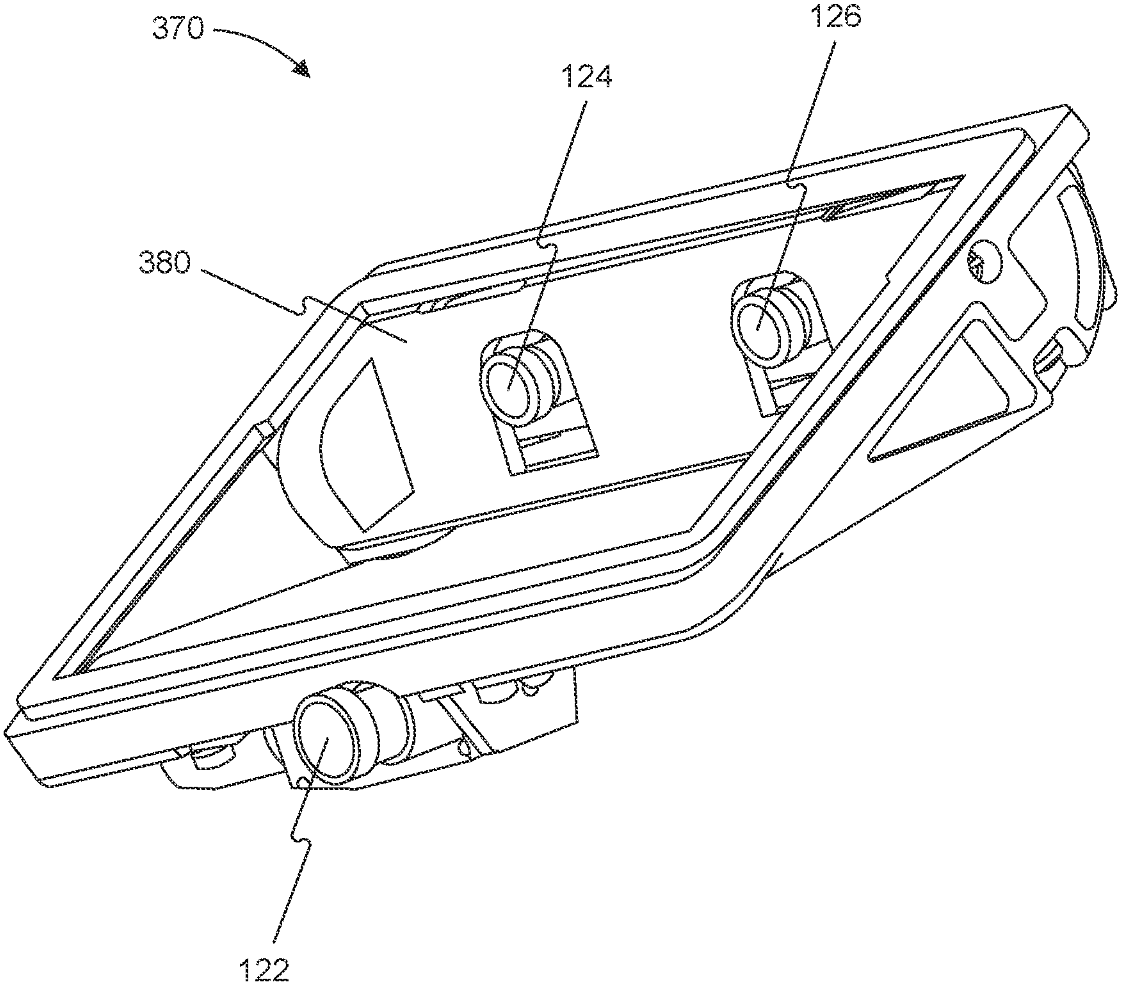
FIG. 3B is an illustration of an example of a camera mount that is configured to be positioned behind a rearview mirror and against a vehicle windshield consistent with the disclosed embodiments.
Figure 3C:
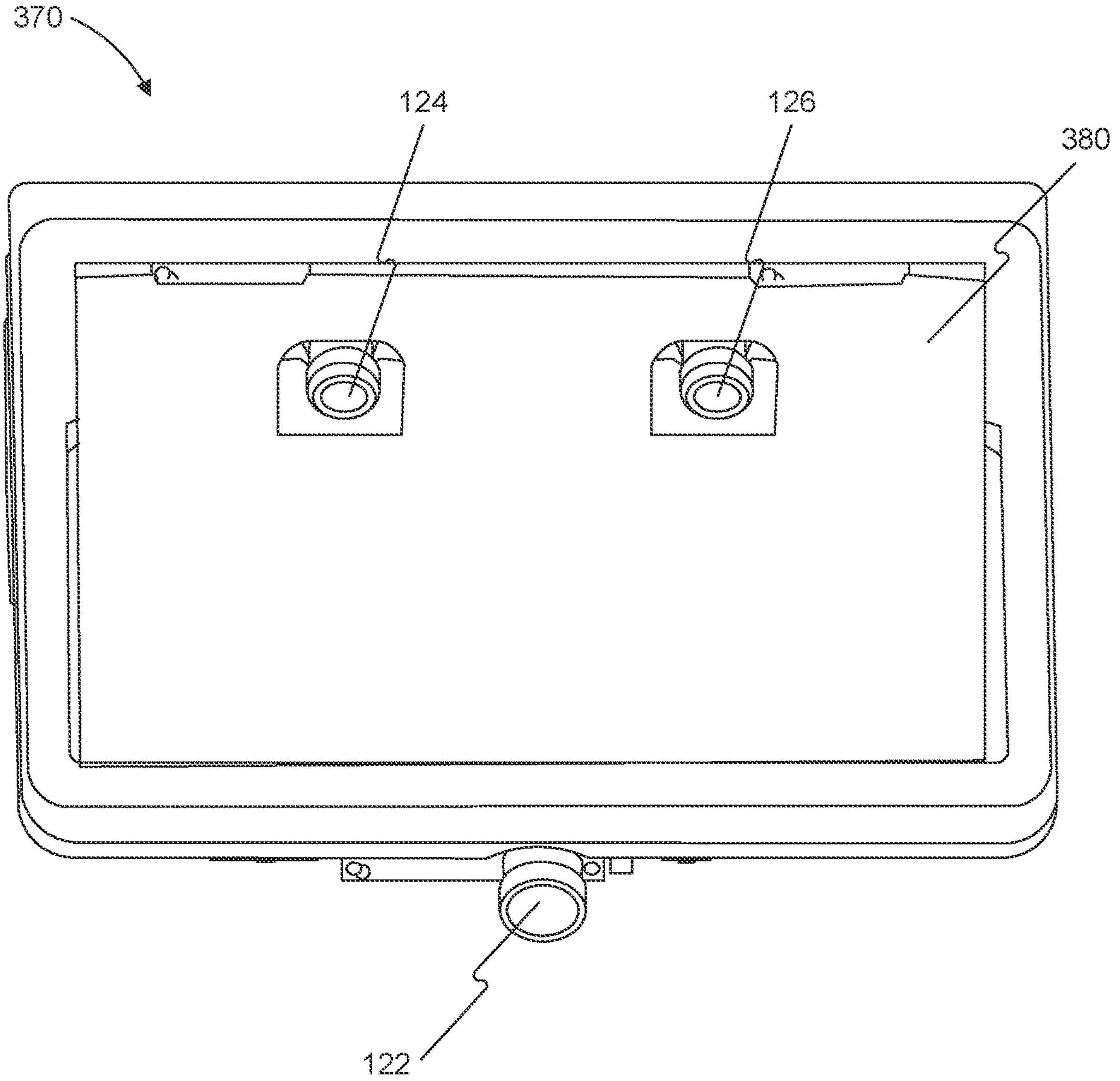
FIG. 3C is an illustration of the camera mount shown in FIG. 3B from a different perspective consistent with the disclosed embodiments.
Figure 3D:
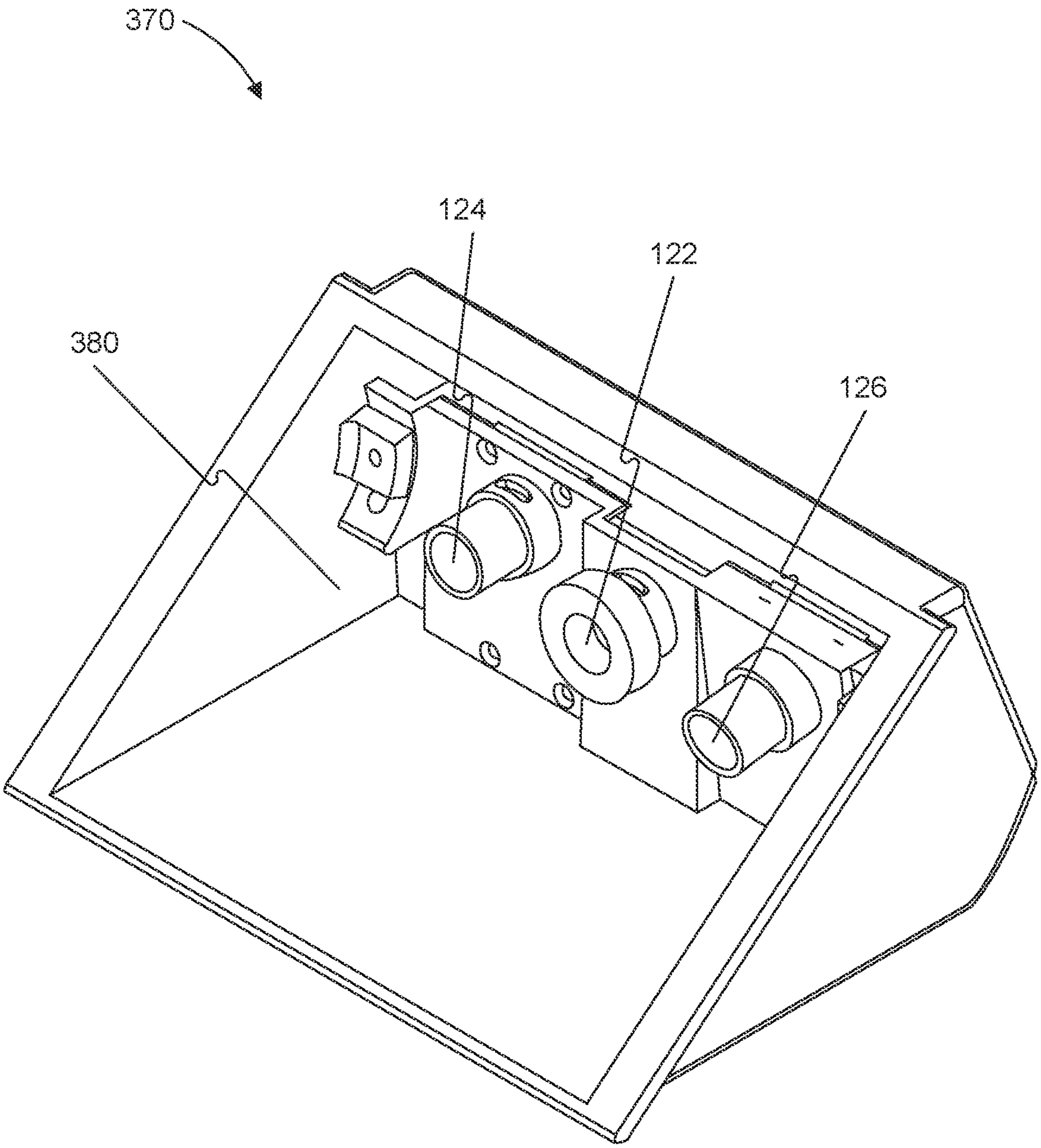
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that it aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). Other camera configurations are consistent with the disclosed embodiments, and the configurations disclosed herein are examples. For example, system 100 may include a configuration of any number of cameras (e.g., one, two, three, four, five, six, seven, eight, etc.) Furthermore, system 100 may include "clusters" of cameras. For example, a cluster of cameras (including any appropriate number of cameras, e.g., one, four, eight, etc.) may be forward-facing relative to a vehicle, or may be facing any other direction (e.g., reward-facing, side-facing, at an angle, etc.) Accordingly, system 100 may include multiple clusters of cameras, with each cluster oriented in a particular direction to capture images from a particular region of a vehicle's environment.

The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122-126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122-126 may be positioned behind rearview mirror 310 and positioned substantially side-by-side (e.g., 6 cm apart). Further, in some embodiments, as discussed above, one or more of image capture devices 122-126 may be mounted behind glare shield 380 that is flush with the windshield of vehicle 200. Such shielding may act to minimize the impact of any reflections from inside the car on image capture devices 122-126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122-126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from the main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system). Furthermore, in some embodiments, redundancy and validation of received data may be supplemented based on information received from one more sensors (e.g., radar, lidar, acoustic sensors, information received from one or more transceivers outside of a vehicle, etc.).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
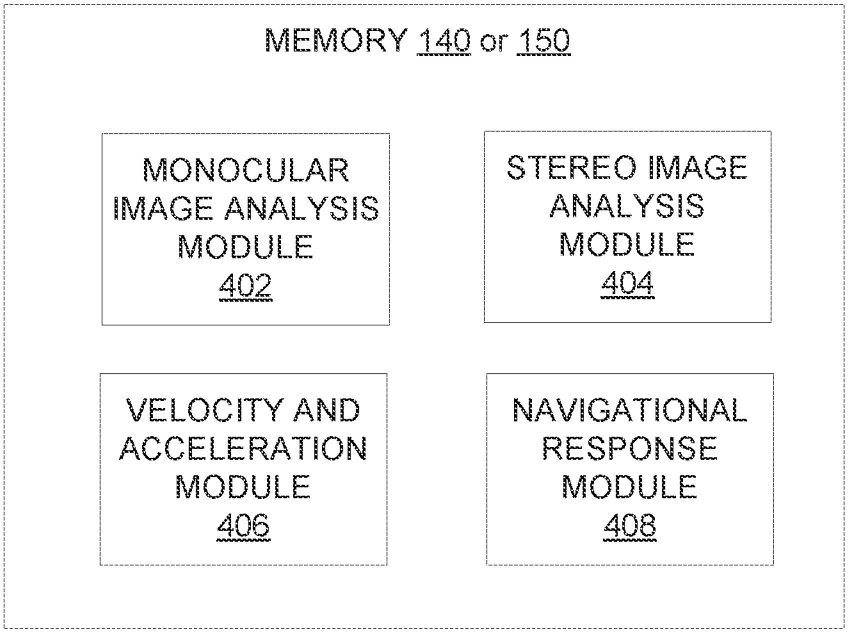
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, applications processor 180 and/or image processor 190 may execute the instructions stored in any of modules 402-408 included in memory 140. One of skill in the art will understand that references in the following discussions to processing unit 110 may refer to applications processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar, lidar, etc.) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with determining a navigational response.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408. Furthermore, in some embodiments, stereo image analysis module 404 may implement techniques associated with a trained system (such as a neural network or a deep neural network) or an untrained system.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Furthermore, any of the modules (e.g., modules 402, 404, and 406) disclosed herein may implement techniques associated with a trained system (such as a neural network or a deep neural network) or an untrained system.

Figure 5A:
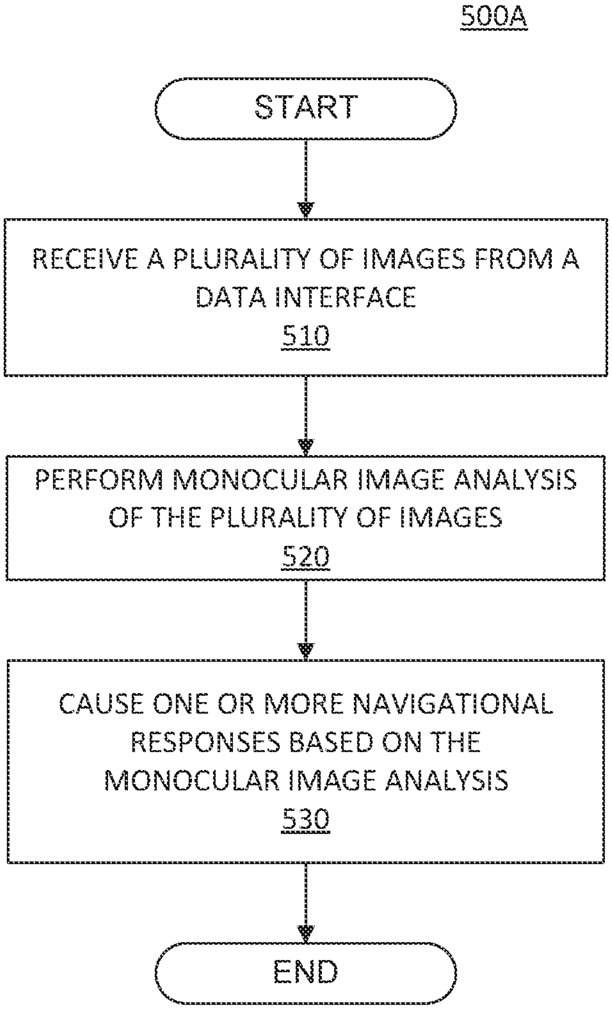
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
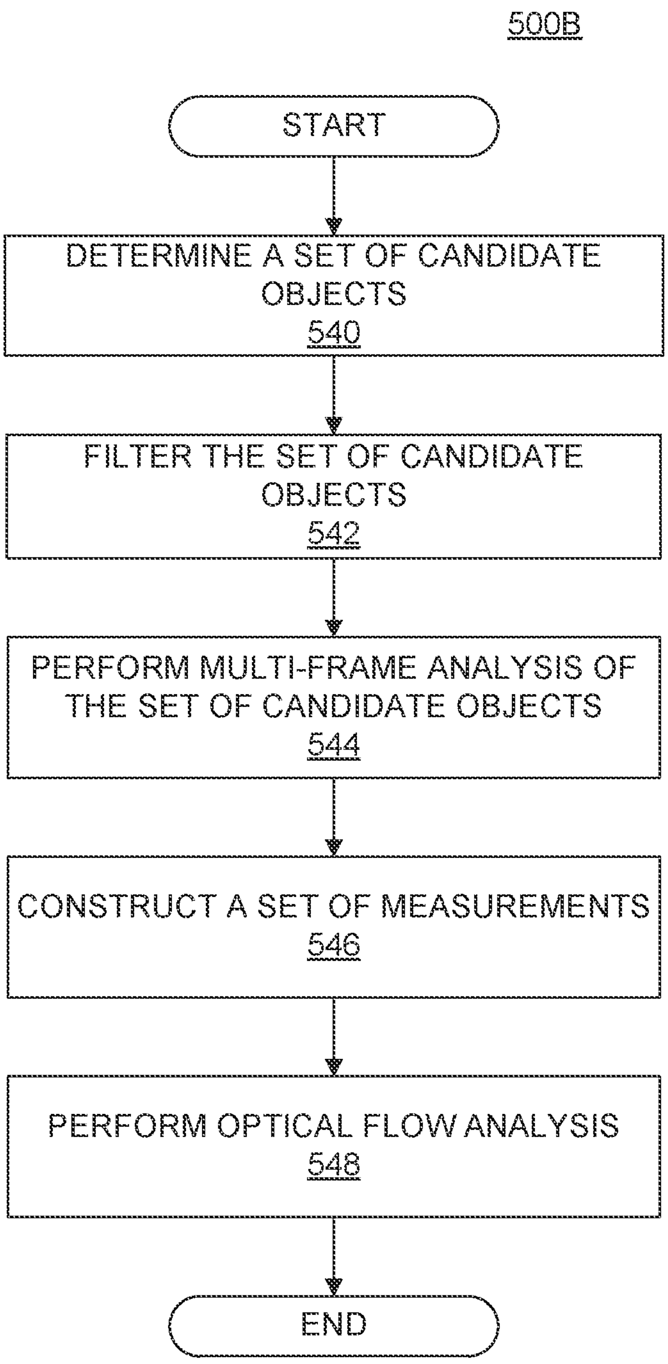
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
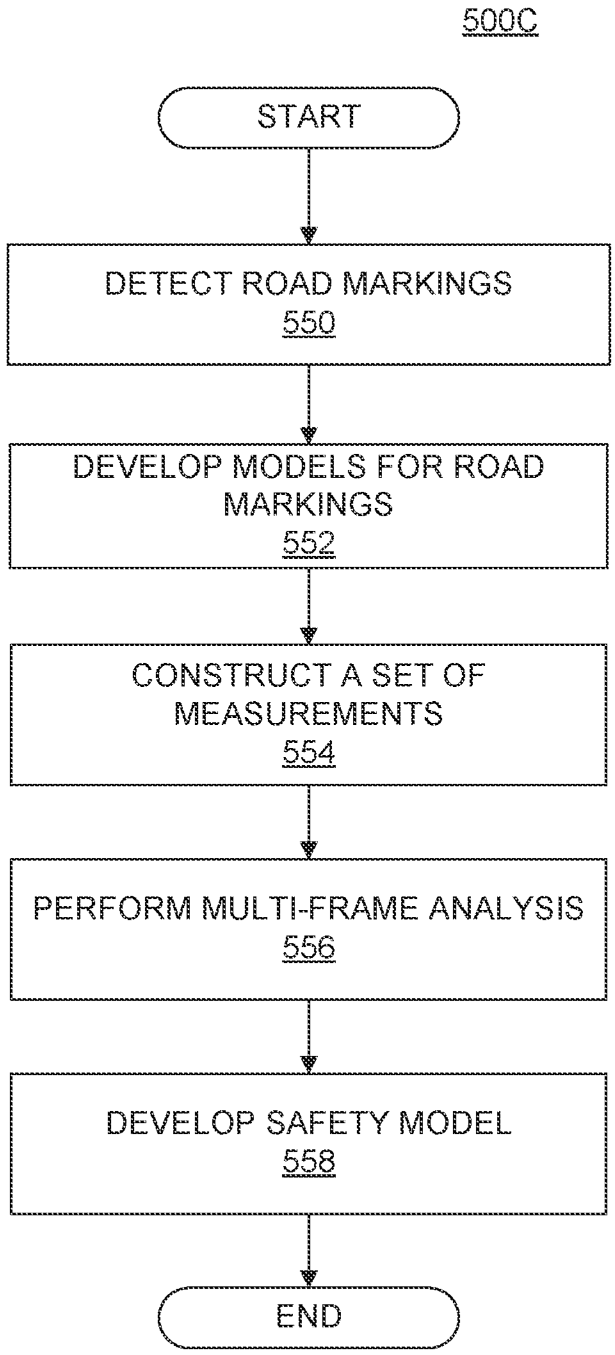
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550-556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
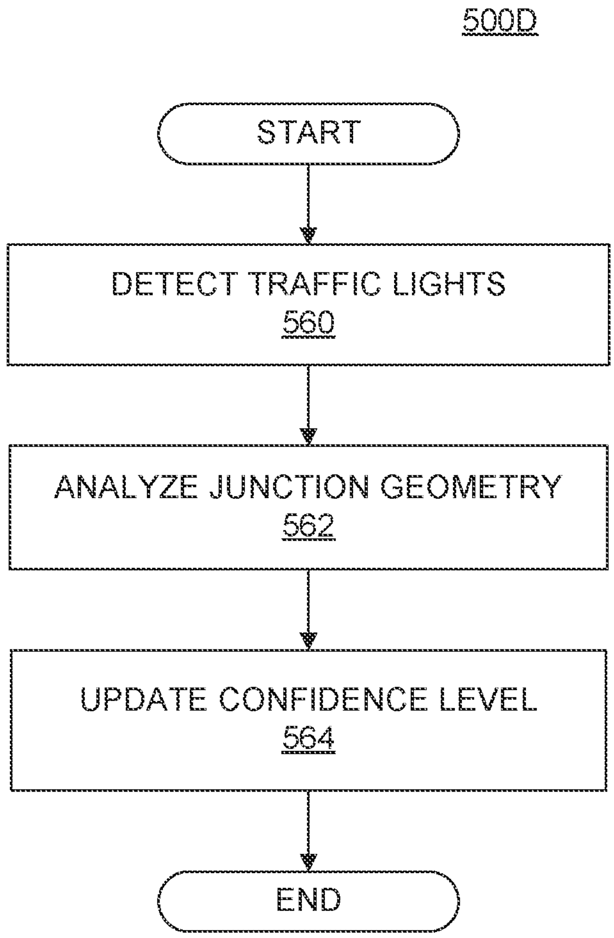
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560-564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
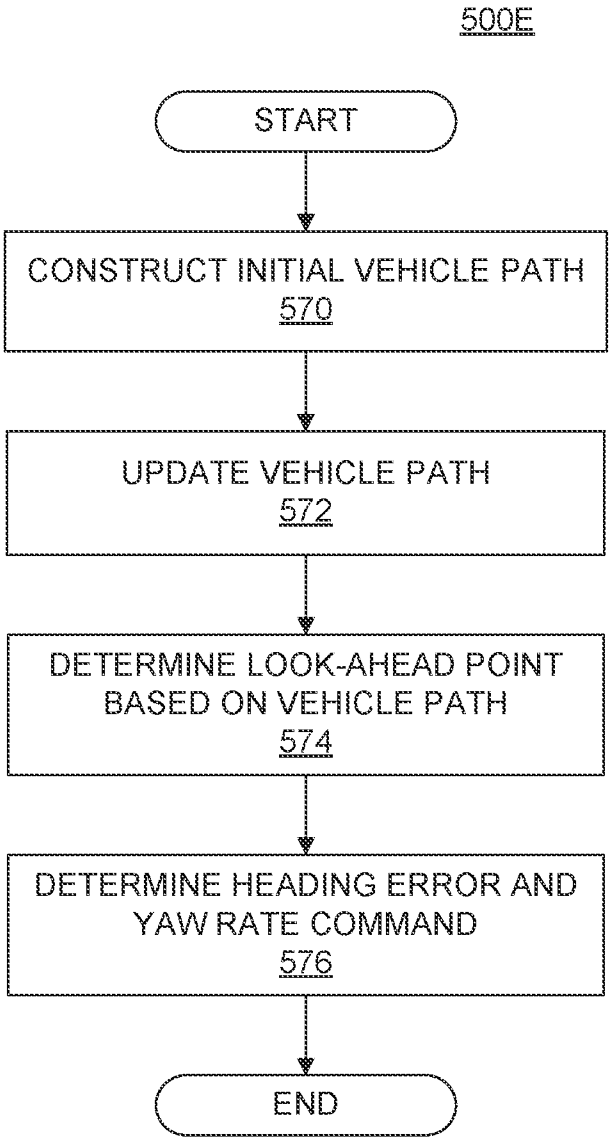
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance di between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance di described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_i, z_i)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arctangent of the look-ahead point, e.g., arctan $(x_i/z_i)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
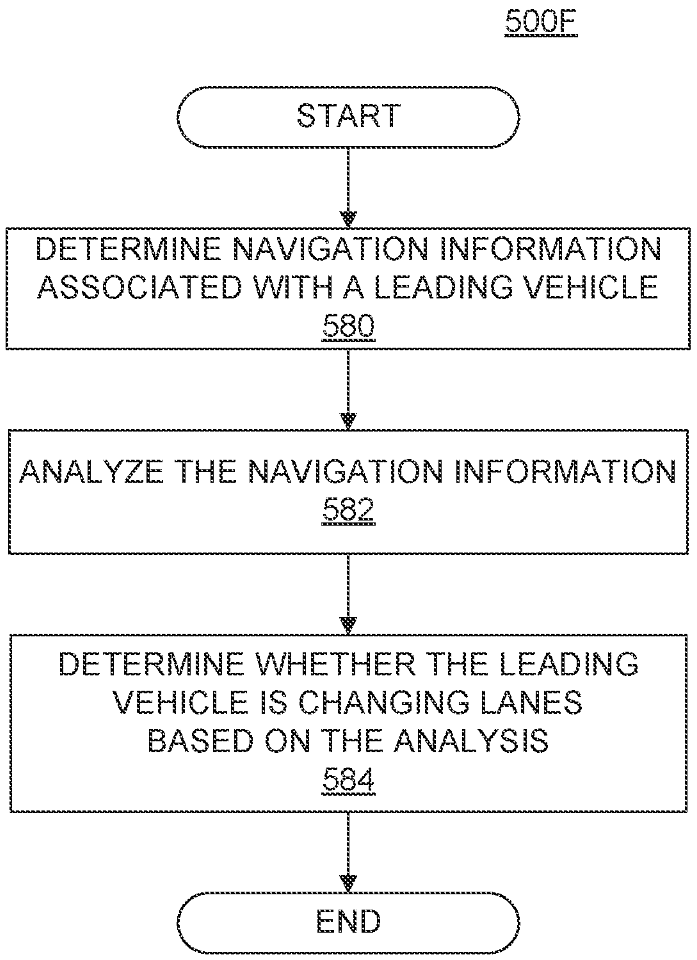
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2+\delta_x^2)/2/(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights. Furthermore, in some embodiments, the analysis may make use of trained system (e.g., a machine learning or deep learning system), which may, for example, estimate a future path ahead of a current location of a vehicle based on an image captured at the current location.

Figure 6:
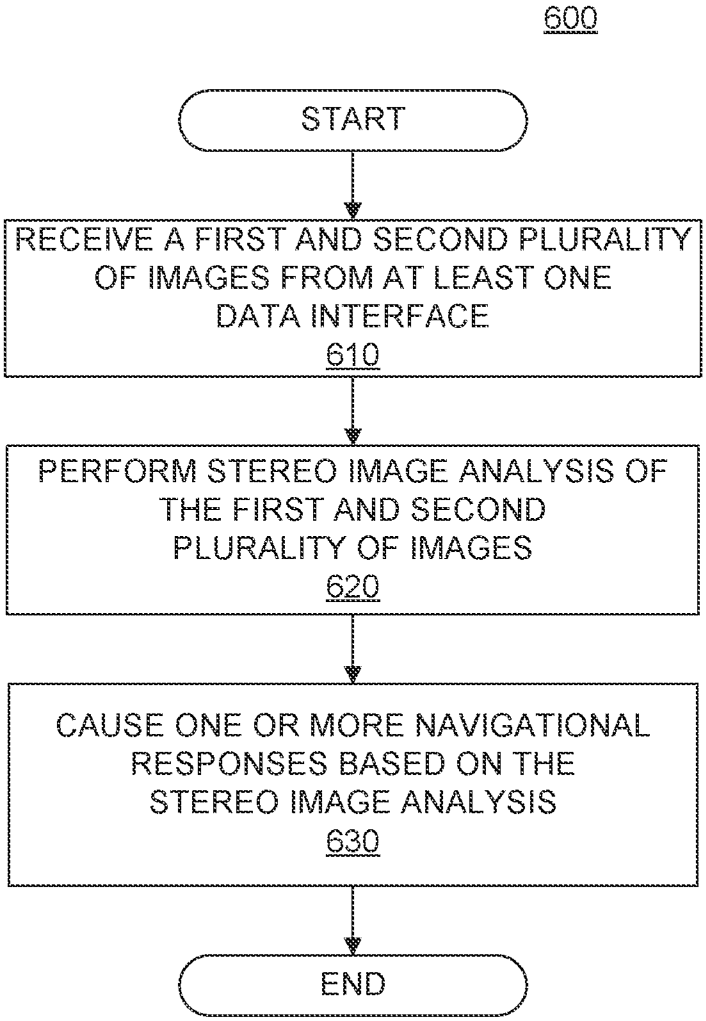
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing in the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
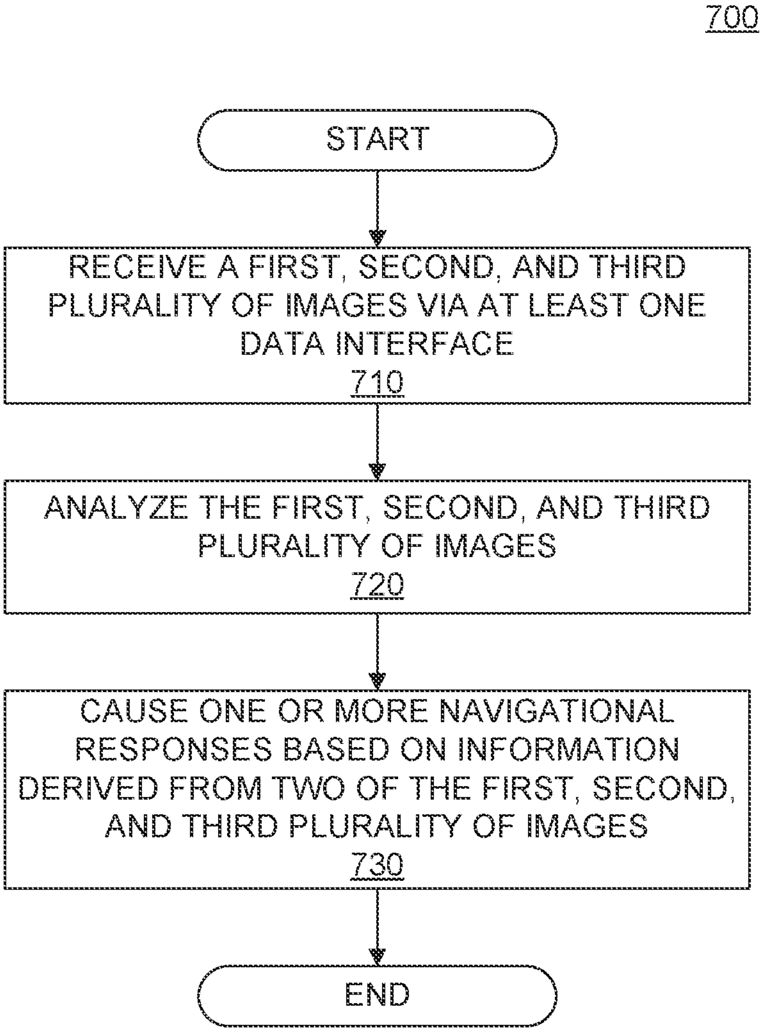
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126—including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof.

LIDAR and Image Alignment

Figure 8:
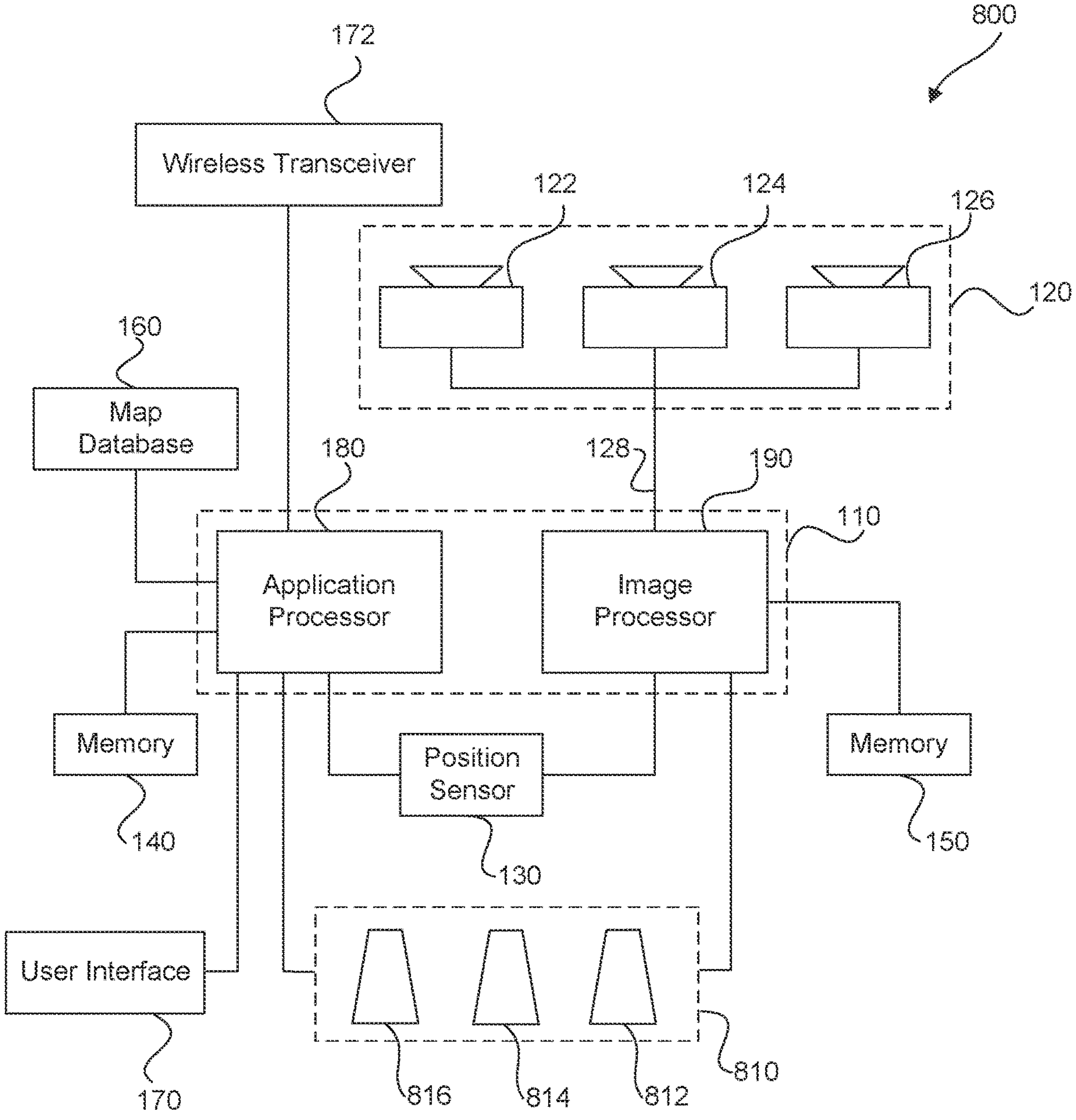
FIG. 8 is a diagrammatic representation of an exemplary system consistent with the disclosed embodiments.

FIG. 8 is a block diagram representation of a system 800 consistent with exemplary disclosed embodiments. System 800 may include various components depending on the requirements of a particular implementation. In some embodiments, system 800 may include processing unit 110, image acquisition unit 120, position sensor 130, one or more memory units 140, 150, map database 160, user interface 170, and wireless transceiver 172 described in the sections above. Additionally, system 800 may include a LIDAR system 810 including one or more LIDAR units 812, 814, and 816.

Figure 9:
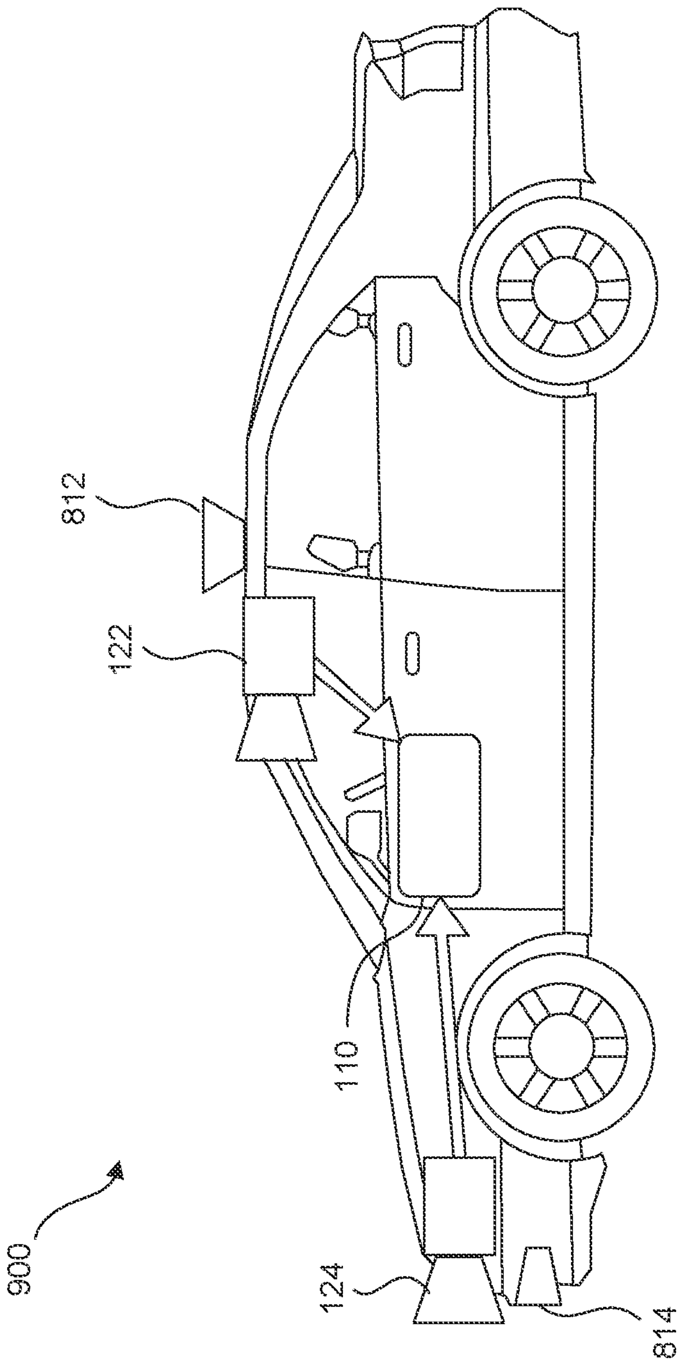
FIG. 9 is a diagrammatic side view representation of an exemplary vehicle including a system consistent with the disclosed embodiments.

While three LIDAR units are shown in LIDAR system 810, more or fewer LIDAR units may be used depending on the requirements of a particular application. Further, any of the LIDAR units 812, 814, and 816, or any other available LIDAR units in LIDAR system 810 may be positioned at any suitable location on a vehicle. For example, as shown in the example embodiment of FIG. 9, vehicle 900 may include image capture devices 122 and 124 (e.g., cameras) described in the sections above. Vehicle 900 may also be equipped with a LIDAR system 810 including a LIDAR unit 812 and/or a LIDAR unit 814. Similar to image capture devices 122 and 124, the outputs provided by LIDAR units 812 and 814 may be supplied directly or indirectly to processing unit 110. As shown, LIDAR unit 812 may be positioned on a roof of host vehicle 900. Such a unit may include a rotating unit configured to gather LIDAR reflection information within a 360 degree field of view around vehicle 900 or from any sub-segment of the 360 degree field of view (e.g., one or more FOVs each representing less than 360 degrees). In some embodiments, LIDAR unit 814 may be positioned at a forward location on vehicle 900 (e.g., near the headlights, in the front grill, near the fog lamps, in a forward bumper, or at any other suitable location). In some cases, LIDAR units installed on a forward portion of vehicle 900 may collect reflection information from a field of view in an environment forward of vehicle 900. While not shown, other LIDAR units may be deployed on vehicle 900. For example, one or more LIDAR units may be placed on sides of vehicle 900 to gather reflection information from regions adjacent to the sides of vehicle 900. Alternatively or additionally, one or more LIDAR units may be placed on an aft portion of vehicle 900 (e.g., in rear bumper, near the tail lights, etc.) to gather reflection information from a region behind the host vehicle 900.

Any suitable type of LIDAR unit may be included on host vehicle 900. In some cases, LIDAR system 810 may include one or more flash LIDAR units (e.g., 3D flash LIDAR) where an entire LIDAR field of view (FOV) is illuminated with a single laser pulse, and a sensor including rows and columns of pixels to record returned light intensity and time of flight/depth information. Such flash systems may illuminate a scene and collect LIDAR "images" multiple times per second. Scanning LIDAR units may also be employed. Such scanning LIDAR units may rely on one or more techniques for dispersing a laser beam over a particular FOV. In some cases, a scanning LIDAR unit may include a scanning mirror that deflects and directs a laser beam toward objects within the FOV. Scanning mirrors may rotate through a full 360 degrees or may rotate along a single axis or multiple axes over less than 360 degrees to direct the laser toward a predetermined FOV. In some cases, LIDAR units may scan one horizontal line. In other cases, a LIDAR unit may scan multiple horizontal lines within an FOV, effectively rastering a particular FOV multiple times per second.

The LIDAR units in LIDAR system 810 may include any suitable laser source. In some embodiments, the LIDAR units may employ a continuous laser. In other cases, the LIDAR units may rely upon pulsed laser emissions. Additionally, any suitable laser wavelength may be employed. In some cases, a wavelength of between about 600 nm to about 1000 nm may be used.

The LIDAR units in LIDAR system 810 may also include any suitable type of sensor and provide any suitable type of output. In some cases, sensors of the LIDAR units may include solid state photodetectors, such as one or more photodiodes or photomultipliers. The sensors may also include one or more CMOS or CCD devices including any number of pixels. These sensors may be sensitive to laser light reflected from a scene within the LIDAR FOV. The sensors may enable various types of output from a LIDAR unit. In some cases, a LIDAR unit may output raw light intensity values and time of flight information representative of the reflected laser light collected at each sensor or at each pixel or sub-component of a particular sensor. Additionally or alternatively, a LIDAR unit may output a point cloud (e.g., a 3D point cloud) that may include light intensity and depth/distance information relative to each collected point). LIDAR units may also output various types of depth maps representative of light reflection amplitude and distance to points within a field of view. LIDAR units may provide depth or distance information relative to particular points within an FOV by noting a time at which light from the LIDAR's light source was initially projected toward the FOV and recording a time at which the incident laser light is received by a sensor in the LIDAR unit. The time difference may represent a time of flight, which may be directly related to the round trip distance that the incident laser light traveled from the laser source to a reflecting object and back to the LIDAR unit. Monitoring the time of flight information associated with individual laser spots or small segments of a LIDAR FOV can provide accurate distance information for a plurality of points within the FOV (e.g., mapping to even very small features of objects within the FOV). In some cases, LIDAR units may output more complex information, such as classification information that correlates one or more laser reflections with a type of object from which the laser reflection was acquired.

The output from LIDAR system 810 may be provided to one or more processing units associated with host vehicle 900. For example, as shown in FIG. 8, output from any of the LIDAR units 812, 814, and 816 may be provided to processing unit 110. In some cases, the outputs of the LIDAR units may be provided to application processor 180 for performing the functionality described in the sections below. Alternatively or additionally, the outputs of the LIDAR units may be provided to image processor 190 for performing the functionality described in the sections below.

Both image acquisition unit 120 and LIDAR system 810 have strengths. For example, object recognition and classification may, at least under certain conditions, be performed more easily with respect to images acquired from cameras than from LIDAR information. On the other hand, camera-based images lack directly determined distance information. Therefore, distance determinations or estimations based on analysis of camera-based images may, in some cases, depend on observations of scaling, optical flow between images, etc. In some LIDAR systems, object classification or recognition may not be performed as easily as may be performed based on images acquired from a camera. However, LIDAR units may provide accurate distance information relative to even fine features of objects located in an environment of the host vehicle.

Combining the object recognition and classification capabilities of camera-based image techniques with the depth measurement capabilities of LIDAR systems may offer the potential for increased functionality in a wide range of applications including, for example, the navigation and operation of autonomous vehicles. Combining these capabilities or other aspects of image-based and LIDAR systems, however, may require correlation of the outputs of the various systems. For example, depth information relative to a particular object in a LIDAR FOV may not be useful in some applications if the particular object cannot be located or recognized within images acquired from camera-based systems. Even small degrees of misalignment between acquired images and LIDAR system outputs from overlapping regions or FOVs may significantly impact the applicability or usefulness of the acquired images together with the LIDAR system outputs.

Many automotive manufacturers working on the development of an autonomous vehicle have adopted the idea that any configuration of sensors mounted on a vehicle should include a camera system in addition to a LIDAR system. As a consequence, there is a need to calibrate these different sensors in order to realize the potential that the combined systems may offer. The disclosed embodiments may include features and functionality designed to calibrate overlapping camera and LIDAR sensors (e.g., those having FOVs that at least partially overlap with one another). In many situations, it may be desirable for the system to recalibrate or to verify a previous calibration validity during operation (e.g., in an uncontrolled environment during driving.

One challenge in solving this task may result from difficulties in associating, correlating, and/or aligning the readings or outputs from two sensors of different modalities. For example, given a particular LIDAR reflection, there may be difficulty in determining a particular pixel in an acquired image that includes the same location in an environment from which the LIDAR reflection was obtained. One potential approach to effectively align acquired image information with LIDAR reflection information may include alignment between LIDAR output and one or more acquired images. In some cases, such alignment may include the alignment of actual features of each type of output (e.g., alignment of pixel regions in one or more images with corresponding LIDAR reflection information contained in an LIDAR output such as a point cloud, depth map or any other type of LIDAR output). In other cases, the alignment may be more complex and may include, for example, the alignment of LIDAR output, such as reflections obtained from a road, with a road plane estimation derived based on an acquired image or images using, for example, structure from motion techniques.

In some cases, the alignment between one or more acquired images and an output of the LIDAR may be performed in image space. That is, where an image is acquired from an FOV that at least partially overlaps with a LIDAR FOV, the two-dimensional acquired image may be aligned with a corresponding region of the LIDAR output. Such alignment in image space may involve two degrees of freedom, including rotation and translation. Thus, at least one acquired image and the LIDAR output may be rotated and or translated relative to one another such that corresponding regions in both overlap. This technique may involve a determination of one or more transformation operations that result in the alignment of at least one image with the LIDAR output. In formal terms, a rotational matrix and a translational matrix may be determined that aligns regions in an acquired image with corresponding regions in the LIDAR output.

An example technique for determining the alignment matrices R (rotation) and T (translation) will now be described. If it is assumed that p is a 3D point in the LIDAR coordinate system, the goal is to find calibration matrices R, T such that $\tilde{p}=Rp+T$ is the same point in the camera coordinate system. Now if it is assumed that $\tilde{p}$ was reflected from the road, it means that $\tilde{p}$ lays on the road plane (after aligning the road plane with the LIDAR grab time using odometry with appearance based EgoMotion). Defining the road plane by (n, d) leads to the following equation:

$$n^T\tilde{p} = n^T(Rp+T) = d$$

To determine whether a point has been reflected from the road, it can be assumed that a rough calibration has been achieved, and an image-based technique may be used to determine a drivable area (e.g., recognizing through image analysis a drivable free space in an environment of the host vehicle). A margin may be used to account for calibration errors.

The equation $n^T(Rp+T)=d$ is a result of a single observation. To calculate the rotational and translational transform matrices R and T, a least squares method may be used. In this technique, this equation may be rearranged into the form:

$$a_i^T x = b_i.$$

Such rearrangement may be performed as follows:

$$\begin{aligned} d &= n^T(Rp+T) \\ &\approx n^T((I+[w]_x)p+T) \\ &= n^T(p+w\times p+T) \\ &= n^T(p-p\times w+T) \end{aligned}$$

$$n^T[-[p]_x \quad I]\begin{bmatrix} w \\ T \end{bmatrix} = d - n^T p$$

This leads to:

$$a = n^T[-[p]_x \quad I]$$

$$b = d - n^T p$$

For a batch of m observations, an m×3 matrix can be constructed ($A=(a_1| \ldots |a_m)^T$) along with the m×1 matrix $b=(b_1 \ldots b_m)^T$, and the objective may be defined as:

$$\operatorname{argmin}_{x\in\mathbb{R}^6}\|Ax-b\|$$

The optimization output is a$\hat{x}\in\mathbb{R}^6$ which may then be decomposed to:

$$\hat{x} = (w^T|T^T)^T.$$

To reconstruct a rotation matrix from the output vector w, the following process may be used:

$$\theta = \|w\|$$

$$\tilde{w} = \frac{w}{\|w\|}$$

$$R = \cos(\theta)I + \sin(\theta)[\tilde{w}]_x + (1-\cos(\theta))\tilde{w}\tilde{w}^T$$

Rotation is a nonlinear transformation, and as a result, the basic problem is non-linear. The least-squares optimization goal above, however, is linear. The reason for the difference is a linear approximation was used for the rotation. The problem became linear once $(I+[w]_x)$ was used, which is the first order Taylor approximation of the 3D rotation around the axis $$\tilde{w} = \frac{w}{\|w\|}$$

in an angle of $\theta=\|w\|$.

The linearization of the problem may cause a precision loss. To overcome this potential loss, the process described above may be repeated several times in an iterative fashion. Each iteration may be initialized with the previously determined matrices, and the new result may be used to update the calibration matrices as follows:

$$R^{(t+1)} = RR^{(6)}$$

$$T^{(t+1)} = RT^{(t)} + T$$

In some embodiments, outliers in the calculation may be rejected. To reject outliers in practice, an IRLS (Iterative-Reweighted-Least-Squares) method may be employed in each iteration instead of the Least Squares optimization process described above.

In some embodiments, other methods may be used to compute the rotation and translation matrices or any other transformations between regions in an acquired image with corresponding regions in the LIDAR output. Further, in some embodiments, other techniques may be used without the use of the rotation and/or translation matrices, using, for example, one or more processing techniques.

Determination of the R and T matrices may enable alignment of one or more acquired images, in image space, with an output of a LIDAR unit. As a result, depth or distance information available from the LIDAR output may be correlated with objects appearing in the one or more images. Such correlation and the resulting enrichment of the image information may enable determination of a number of different navigational characteristics associated with the host vehicle. As will be discussed in more detail below, such navigational characteristics may include the determination of elevation values associated with various points along a roadway, determination of the host vehicle speed, determination of a road plane location relative to the host vehicle (along straight, banked, or curved roads, etc.), among other potential uses.

In practice, the R and T matrices, or any other suitable transform between an acquired image and an output of the LIDAR may be determined by at least one processor onboard vehicle 900 (e.g., processor unit 110). The at least one processor may receive a stream of images captured by one or more cameras (e.g., cameras 122, 124) onboard the host vehicle, wherein the captured images are representative of an environment surrounding the host vehicle. The at least one processor may also receive an output of a LIDAR unit (e.g., LIDAR unit 812 or 814) onboard the host vehicle. The output of the LIDAR may be representative of a plurality of laser reflections from at least a portion of the environment surrounding the host vehicle. The at least one processor may determine at least one indicator of relative alignment, in image space, between the output of the LIDAR and at least one image captured by the camera. In some cases, as discussed above, the at least one indicator of the relative alignment between the output of the LIDAR and the at least one image captured by the camera includes a translational transform in image space (e.g., the translation matrix, T). In some cases, the at least one indicator of the relative alignment between the output of the LIDAR and the at least one image captured by the camera may include a rotational transform in image space (e.g., the rotation matrix, R).

Using the determined alignment, the at least one processor may attribute LIDAR reflection information to one or more objects identified in the at least one image based on the at least one indicator of the relative alignment between the output of the LIDAR and the at least one image captured by the camera. And, the attributed LIDAR reflection information and the one or more objects identified in the at least one image may be used to determine at least one navigational characteristic associated with the host vehicle (e.g., road elevation, vehicle speed, etc.).

Figure 10:
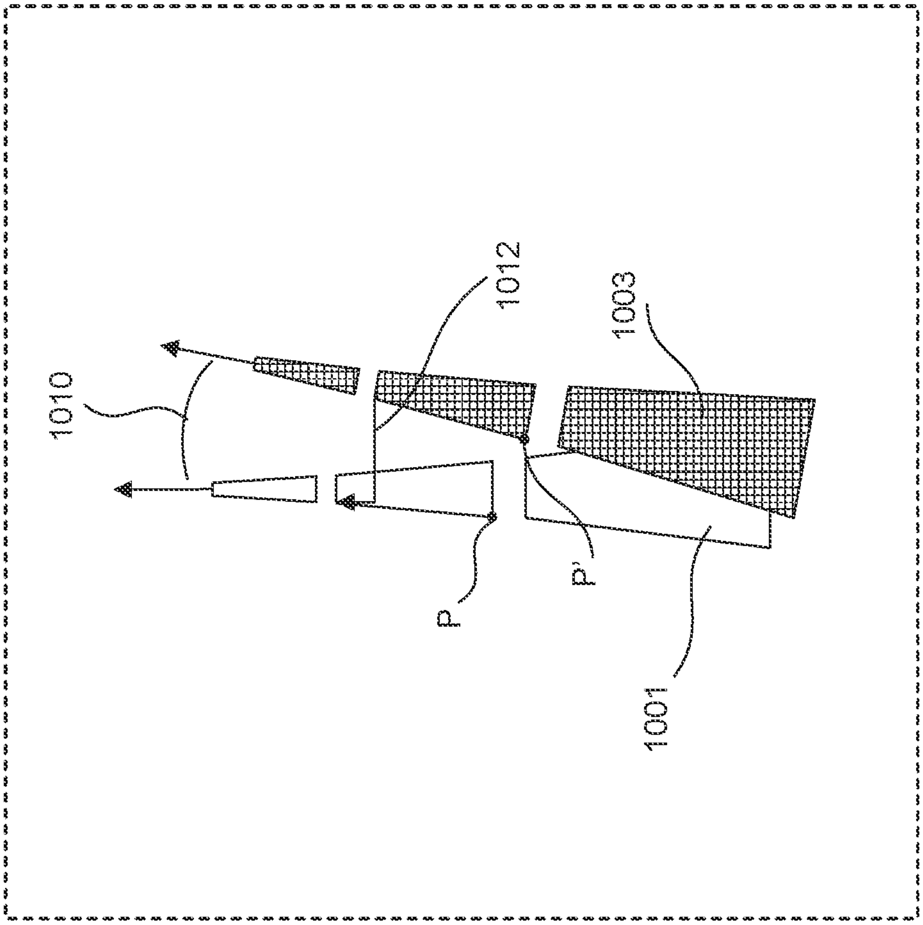
FIG. 10 provides a conceptual illustration representing an alignment of image and LIDAR output information consistent with exemplary disclosed embodiments.

FIG. 10 provides a simplified, conceptual example of the alignment technique described above. For example, FIG. 10 shows a single feature, including a dashed highway lane marking 1001, that may be acquired as part of one or more camera images captured from an environment of a host vehicle. FIG. 10 also includes a LIDAR representation 1003 of the same dashed highway lane marking. As a result of the acquiring camera exhibiting at least some degree of misalignment with the reflection capturing LIDAR unit, camera-acquired lane marking 1001 may not be initially aligned, in image space, with the LIDAR-acquired lane marking 1003. While any degree of misalignment may be possible, for clarity of concept, the degree of misalignment shown in FIG. 10 may be more significant than would be expected in normal operating conditions. In this current, misaligned state, the LIDAR output may not be as useful as if the two outputs were aligned. For example, depth information obtained by the LIDAR unit for point P' would not correspond with the location of point P in the acquired image, but rather would “appear” to correspond to another point translated in image space away from point P. As a result of this mismatch, the depth information of the LIDAR would be of little assistance in augmenting any analysis based on the acquired image of lane marking 1001.

Through implementation of the above described techniques, however, the LIDAR output may be aligned or correlated with the acquired image information. For example, a transform may be determined in image space that would result in the overlap of portions of LIDAR-acquired lane marking 1003 with their corresponding counterpart portions of camera-acquired lane marking 1001. In some cases, as described above, a rotational matrix R and a translational matrix T may be determined such that moving, e.g., LIDAR-acquired lane marking 1003 through some rotation 1010 and/or translation 1012 would result in an overlap between point P' and point P. In some cases, most or all other points on LIDAR-acquired lane marking 1003 would overlap with their counterpart points on camera-acquired lane marking 1001 through operation of the determined transform.

In one example, a road surface may be detected using a camera-only methodology. Such a methodology may include the use of motion flow across a plurality of images. Various features may be observed in camera images, and the optical flow of the features may be determined based on the images. From this analysis, a position of the observed objects may be obtained in 3-D, and a calculation/estimate of a plane representative of the road may be determined. From a LIDAR unit output, a series of point reflections may be obtained. As noted above, rotation and translation errors may be reduced or eliminated by aligning camera images with LIDAR output. In such a process, it may be assumed that the road plane determined based on the camera image data and the associated road plane equation will hold for the LIDAR output (where point reflections from an area associated with the road will also lie on the calculated road plane). If the plane equation does not agree with the LIDAR points, rotational and/or translational parameter values may be determined that reduce, minimize, or even eliminate errors between the LIDAR points and the camera image points. As in the method described above, rotation may be approximated by a linear operation, which is accurate if rotational discrepancy is small, which it should be). The rotational transform may then be determined iteratively using least squares or any other suitable method, and outliers may be rejected. A similar approach may be used to determine the translation parameter values for providing alignment in image space. The translation problem, however, is already linear, so there may be no need for linearizing prior to using a fitting technique.

In some embodiments, an error may be detected when a variance of the relative alignment between the output of the LIDAR and the at least one image captured by the camera over time are indicative of an error. For example, such time period may include a short period of time (e.g., 1 or more microseconds, 1 second, 2 seconds, etc.) during with the camera-LIDAR is re-calibrated several times.

Of course, as the transform determination method relies upon such estimation techniques as least squares fitting, iterative estimation, etc. the transform may not result in perfect overlap of every point. The transform, however, may provide enough alignment and correlation, however, that depth or distance information obtained via the LIDAR unit for the various points on LIDAR-acquired lane marking 1003 may be correlated or used together with points or features observed on camera-acquired lane marking 1001. Additionally, the alignment may enable or assist in classification of LIDAR detected objects through comparison with their counterparts in one or more aligned camera-based images. Camera-based image analysis may be better than LIDAR, for example, in determining what is a road and what is non-road. In many cases, the rich visual information from camera-acquired images may be used to augment information available based on a LIDAR system output.

The determined indicator of relative alignment between the output of the LIDAR and the at least one image captured by the camera (e.g., the transformation matrices in some cases) may be used for more than the alignment of LIDAR and camera information. For example, in some embodiments such an indicator of relative alignment can be used to detect operational errors with an onboard camera and/or a LIDAR unit. If a determined indicator of relative alignment is associated with a variance suggesting a relative alignment that falls outside of an expected range, then processor unit 110, e.g., may determine that either the acquiring camera or acquiring LIDAR unit has experienced an error. Such errors may include a full or partial mechanical decoupling from the host vehicle, an unintended movement of the camera or LIDAR unit (e.g., pitch, roll, or yaw), a failure in one or more optical components associated with the camera or LIDAR, etc.

The indicator of relative alignment between a camera and LIDAR can also refer to a relative alignment of a camera and LIDAR unit in physical space. For example, a camera may include an optical axis that extends from the camera optics and into an environment of a host vehicle. Similarly, a LIDAR unit may also be associated with a similar central axis. In some cases, the optical axis of the camera and the central axis of the LIDAR may extend through the center of their respective fields of view. Alignment variance between the camera and LIDAR may result in differences in pitch (e.g., up-down variation between the optical axis of the camera and the central axis of the LIDAR) and yaw (e.g., left-right variation between the optical axis of the camera and the central axis of the LIDAR). The alignment variation between the camera and LIDAR may also include differences in roll angle (e.g., rotation of the respective device about its optical/central axis resulting in angular, rotational differences in the respective FOVs).

An understanding of the alignment differences in physical space may provide a basis for obtaining correlation between a LIDAR output and one or more camera images. For example, pitch, roll, and yaw alignment values may be determined that, if applied, result in the most overlap between corresponding features of an acquired image and a LIDAR output. In practice, a first step may be to examine pitch and roll transforms that provide a closest alignment between an acquired image and a LIDAR output (either at a particular time or over a period of time). As a next step, processor 110 may evaluate yaw transformations to refine the alignment obtained based on pitch and roll transforms alone. At the conclusion of this process, processor 110 may have a set of pitch, roll, and yaw transforms that effectively align acquired camera images with counterpart LIDAR output.

The above processes may be performed as part of an initial calibration process that the system may rely upon during operation to correlate image and LIDAR information. During operation of the host vehicle, however, various conditions may result in changes in relative alignment between a camera and a LIDAR unit. Such changes in physical alignment may occur, for example, as a result of temperature changes, shock, vibration, etc. Thus, it may be desirable to repeat the alignment calibration process of the disclosed embodiments during operation of the host vehicle. For example, the system may perform the calibration processes described above (e.g., to determine a relative alignment between the LIDAR and the camera or between their respective outputs) periodically, as needed, or at predetermined intervals (e.g., once per minute, every 10 seconds, every 1 second, or multiple times per second) during operation of the vehicle.

In addition to spatial variations in alignment between the LIDAR and the camera, the LIDAR/camera calibration technique can also account for temporal variations. For example, in situations where the camera employs a rolling shutter, data lines are not all captured from the image sensor at the same time. The times that lines of data are captured by the image sensor may be taken into account when calibrating the LIDAR to the camera. For example, at a particular time defined as the time when the center row of an image was captured, in order to compute road frame parameters at that time, the system may account for the rolling shutter capture times for the lines captured above the center line and also for the lines captured below the center line. In some embodiments, the system may take into account even differences between the LIDAR scan rate/scan time and a camera scan rate when determining the matrices that represent the alignment transformation between the LIDAR and the camera.

The alignment information between a camera and LIDAR may aid in navigation of the host vehicle. For example, in some cases, a calibrated alignment between a camera and LIDAR may aid in navigating along a curved road, banked road, or a road where obstructions obscure portions of the roadway. In such cases, it may be more difficult to obtain camera-based image information relative to the road or the obtained camera-based image information may be less useful than, for example, where a camera acquires images of a flat, straight roadway (which may enable accurate road plane determination based on images alone). In such pre-aligned situations, the system may use the LIDAR output to supplement information obtained via the camera, and navigation may proceed based on LIDAR information even in situations where the camera images may provide insufficient information on their own for certain types of navigation. Such a process flow may proceed as follows. The camera may be relied upon to detect a road plane, and the alignment of the LIDAR system relative to the camera may be determined based on the determined road plane (by any of the processes described above, for example). Then, in situations where the road plane may be more difficult to detect based on camera image data alone (e.g., curved or banked roads, for example), the calibrated LIDAR output may be relied upon more heavily to help determine the road plane. For example, the at least one processor 110 may determine a location of a road plane associated with a road on which the host vehicle travels based on LIDAR reflection information attributed to the road. This determination may also be based on at least a portion of the road identified in one or more images acquired by an onboard camera. Such a process may aid in determining distances to objects on the road plane even where the image-based road plane is less discernable. For example, in some embodiments, LIDAR information attributed to a curved road may be used to help determine a location of a road plane associated with the curved road and based on at least a portion of the curved road identified in at least one image. The LIDAR information acquired from a curved road may include reflections from one or more lane markings along the curved road, and this information may be used to locate the lane markings in real world coordinates (something that may be challenging based on camera image analysis alone).

It may also be possible to enrich information obtained through analysis of camera images with information obtained based on a LIDAR unit output. For example, in some embodiments, the at least one processor 110, through analysis of one or more images acquired by an onboard camera, may determine a first plurality of points associated with a road on which the host vehicle travels. This may be accomplished, for example, by identifying in the images one or more trackable features, and calculating optical flow over a plurality of images. In such a process, a road surface will remain stationary, and its position can then be inferred in 3-D world coordinates. A list of 3-D world points may be assigned to the road surface determined based on camera-based image analysis. The aligned output of one or more LIDAR units may include reflection points corresponding to the same road surface observed in the camera-based images. These reflection points, which may include depth/distance information relative to the points on the observed road surface, may be used to enrich the camera-image derived 3-D points. For example, in some embodiments, the at least one processor 110 may determine a first plurality of points associated with at least a portion of a road identified in at least one image (e.g., 3-D world points obtained through image analysis) and may interleave the first plurality of points with a second plurality of points derived from the LIDAR reflection information. The second plurality of points may be indicative of distances between the host vehicle (or LIDAR unit, which may have a known location relative to the host vehicle) and a plurality of locations on the road.

In some cases, the aligned LIDAR and camera outputs may be used to determine the speed of the host vehicle. For example, LIDAR has the ability to measure absolute distances to objects. In the aligned system, the LIDAR output may provide distance readings to a particular object (e.g., an object stationary in real world coordinates) identifiable in one or more images collected by an onboard camera. By monitoring the changes in the distance measurements and the rate of image collection, the rate of change in distance to an observable object may be determined, which may be indicative of the host vehicle speed. Such speed determinations can be useful in various navigational situations. In many situations, accurate vehicle speed may be important for dead-reckoning between navigational anchors (e.g., recognized landmarks stored in a map) and following a predetermined path (e.g., a spline representing a preferred trajectory along a road segment). As a particular example, such information may be useful, for example, in REM map generation and navigation along a REM road model (e.g., a three-dimensional spline representative of a target trajectory for the host vehicle along a particular road segment or lane of a road segment). Using LIDAR and the camera to determine vehicle speed may provide a more accurate alternative to, for example, the vehicle speedometer, which in some cases could be influenced by such factors as tire pressure, tire size, etc.

In one example process, processor 110 may analyze at least one image from an onboard camera to detect a representation of an object (e.g., an object fixed in world coordinates) in the at least one image. Based on the LIDAR output aligned with the camera output, a distance to the detected object may be determined. By monitoring how the distance information from the LIDAR output changes over time (e.g., at the image capture rate of the camera, which may be 24 fps, 30 fps, etc.), processor 110 may determine a rate at which the detected object appears to be approaching the vehicle. This rate may correspond to the vehicle speed (or may provide a basis for calculating vehicle speed). Once determined based on the aligned LIDAR/camera outputs, the host vehicle speed may also be used to determine relative speeds between the host vehicle and other objects detected, e.g., in the images acquired by a camera.

The aligned camera and LIDAR outputs may also be used to determine the elevation of a road surface at a particular point. On a flat road, a distance to a point on a road where an object is observed (e.g., in a camera acquired image) to contact the road may be determined. When camera and LIDAR outputs are aligned, such a technique may also enable determination of road elevation.

First, an example process for determining distance based on image analysis alone will be described. If only a single camera is used, the range to a particular point may be determined based on perspective cues. For example, two cues may be used. These may include the size of a target vehicle observed in an acquired image and a position of the bottom of the target vehicle in the image. Because the width of a vehicle of unknown type (car, van, truck, etc.) can vary anywhere between 1.5 m and 3 m, a range estimate based on width alone may only be about 30% accurate. While such an estimate may be suitable for a rough check (or possibly to check a level of calibration), it may not be suitable for vehicle actuation control.

Figure 11:
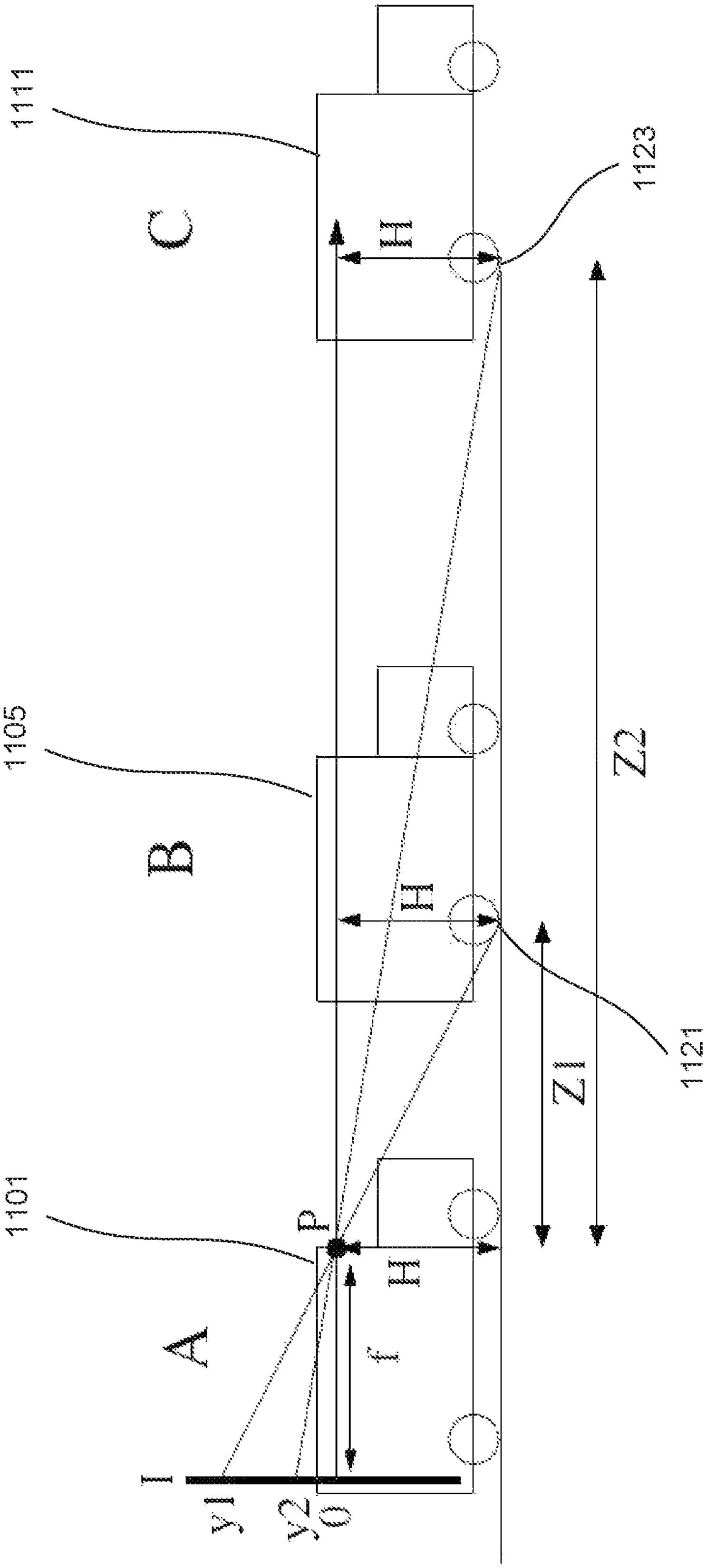
FIG. 11 illustrates an image-based technique for determining distances to target vehicles or objects consistent with exemplary disclosed embodiments.

A better estimate may be achieved using the road geometry and the point in an acquired image at which a target vehicle is observed to contact the road. In the example illustrated in FIG. 11, it may be assumed that the road surface is planar and that a camera is mounted on a host vehicle 1101 at point P, which is at a height, H, above the road surface such that the optical axis of the camera is parallel to the road surface. In this example, the distance to a target vehicle 1105 and to a target vehicle 1111 may be determined based on the observed points 1121 and 1123 where target vehicles 1105 and 1111 contact the road plane. For example, a point on the road at a distance Z in front of the camera will project to the image plane I at a height y, where y is given by the equation:

$$y = \frac{fH}{Z}$$

where H is the camera height in meters. In the example of FIG. 11, the camera at point P has a focal length of f. In this situation, the point 1121 where target vehicle 1105 intersects the road is at a distance ($Z_1$) from the camera. The point of contact 1121 between target vehicle 1105 and the road projects onto the image plane I at a position y1. The equation above can be derived from the similarity of triangles: yf=HZ. The point of contact 1123 between a more distant target vehicle 1111 and the road projects onto the image plane I at a position (y2) which is smaller than (y1).

The camera electronics may convert the image coordinates from mm to pixels and invert the image back to the upright position for processing. To determine the distance to a target vehicle ahead of the host vehicle, assuming a flat road, the point of contact between the target vehicle and the road (e.g., where the tires contact the road) may be detected in an acquired image. Then, the distance to the point of contact may be computed as:

$$Z = \frac{fH}{y}.$$

Figure 12:
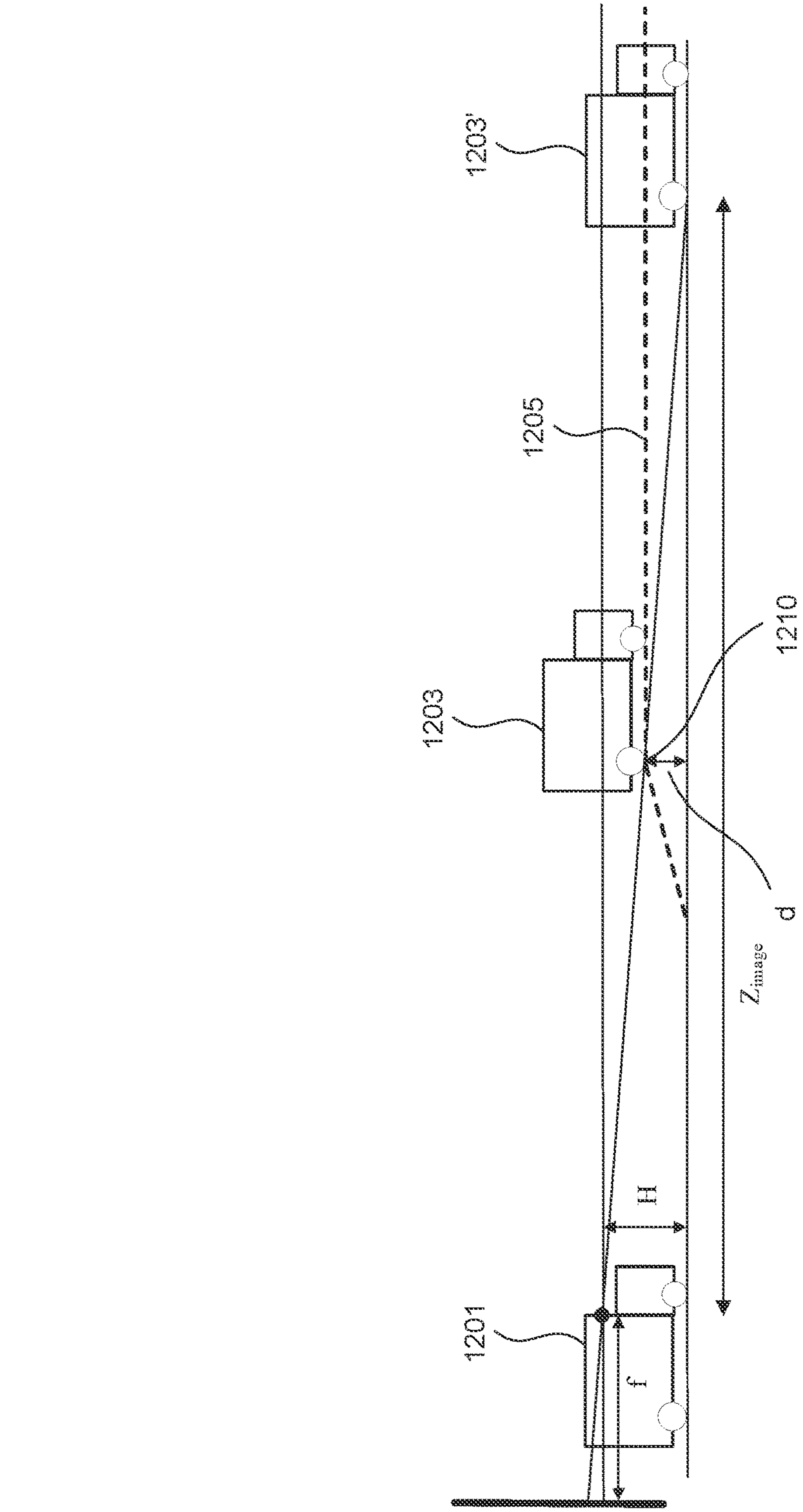
FIG. 12 illustrates a technique for determining road elevation based on aligned image and LIDAR information consistent with exemplary disclosed embodiments.

The technique of determining distance to a target vehicle based on image analysis alone may be limited in situations where the road is not flat. In such cases, aligned LIDAR and camera outputs can assist not only in determining a distance to a target vehicle, but also in determination of other characteristics, such as road elevation. For example, in the situation shown in FIG. 12, a target vehicle 1201 travels along a road behind a target vehicle 1203. In this example, however, the road is not flat. Rather, relative to the host vehicle 1201, target vehicle has traveled up an incline on road 1205 which is higher in elevation by an amount d relative to the road surface on which host vehicle 1201 travels. If the distance to target vehicle 1203 was estimated based on detecting, in an acquired image, of the point 1210 where a tire of target vehicle 1203 contacts road 1205, it may lead to an inaccurate distance, as the project of this point y on the image plane I may appear similar to a projection created if the target vehicle 1203 was located at a more distant position along a flat road (e.g., at the illustrated position of vehicle 1203' shown in FIG. 12).

Reliance on aligned LIDAR output may offer a solution to this issue by resolving scale ambiguities present based on image analysis alone. For example, a distance to contact point 1210 may be determined based on a LIDAR reflection determined to be aligned with a camera image representation of point 1210. Thus, accurate distance information may be determined for point 1210 in situations, for example, where the road surface includes changes in elevation, banking, curvature, etc. In some cases, the LIDAR output relied upon may include one or more reflections from a location other than contact point 1210. For example, especially where an accurate LIDAR reflection may not be available corresponding to contact point 1210, one or more LIDAR reflections acquired from a rear of target vehicle 1203 (or from any other LIDAR reflective surface of target vehicle 1203) may be used to determine a distance to contact point 1210. For example, if a LIDAR reflection is obtained from a rear surface of target vehicle 1203, which may provide a distance between the LIDAR unit and the rear surface of target vehicle 1203, an appropriate offset may be added to the determined distance to account for the difference in distance between the rear surface of target vehicle 1203 and the contact point 1210. This offset may be determined, for example, based on analysis of one or more observed images including a representation of target vehicle 1203 (e.g., based on observed relative scales, etc.).

In some cases, the use of aligned LIDAR and camera outputs can be used to determine an elevation, d, of road 1205 at contact point 1210. For example, based on the technique described above, an apparent distance $Z_{image}$ may be determined based on the camera focal length, the camera height, and the projection, y (e.g., the number of pixels occupied by at least a portion of the target vehicle 1203 on the image plane, I). The actual distance to contact point 1210 may be determined from the aligned LIDAR output. And using geometry and similar triangles, the elevation, d, of road 1205 at contact point 1210 may be determined. Such information may be useful not only for navigating the host vehicle, but may also be especially useful in generating, augmenting, and/or validating map information for road segments traversed by the target vehicle (e.g., a REM map and road model generation).

In some embodiments, the system may use more than one camera (e.g., 1-3 cameras, at least 3 cameras, 3-8 cameras, at least 8 cameras, 9-12 cameras, 1-12 cameras, at least 12 cameras, etc.) and, alternatively, or in addition, the system may use more than one LIDARs (e.g., 1-3 LIDARs, at least 3 LIDARs, 3-8 LIDARs, at least 8 LIDARs, 9-12 LIDARs, 1-12 LIDARs, at least 12 LIDARs, etc.). In such embodiments, there may be some redundancy in fields of view (FOVS) of the cameras and/or LIDARs (e.g., one or more overlapping camera FOVs and/or one or more overlapping LIDAR FOVs). For example, a majority vote system may be used in case there are two or more sensors (LIDAR(s) and/or camera(s)) covering a certain point in real space. Further, in some embodiments, the relative alignment may be resolved for each one of two or more sensors (e.g., camera and LIDAR pairs, such as, e.g., one camera and one LIDAR, two cameras and a single LIDARs, two cameras and two LIDARs, etc.).

Accordingly, in some embodiments, the at least one processor is further programmed to receive a stream of images captured by a plurality of cameras onboard the host vehicle. Alternatively, or in addition, the at least one processor may be programmed to receive output of a plurality of LIDARs onboard the host vehicle. Further, in such embodiments, at least two of the plurality of cameras and the plurality of LIDARs have at least partially overlapping fields of views.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A navigational system for a host vehicle, the system comprising:

at least one processor comprising circuitry and a memory, wherein the memory includes instructions that when executed by the circuitry cause the at least one processor to:

receive a stream of images captured by a camera onboard the host vehicle, wherein the captured images are representative of an environment surrounding the host vehicle;

receive an output of a LIDAR onboard the host vehicle, wherein the output of the LIDAR is representative of a plurality of laser reflections from at least a portion of the environment surrounding the host vehicle;

determine at least one indicator of relative alignment between the output of the LIDAR and at least one image captured by the camera, wherein determining the at least one indicator of relative alignment comprises determining a transform between the at least one image captured by the camera and the output of the LIDAR;

align, in image space, the output of the LIDAR with the at least one image based on the determined at least one indicator of relative alignment; and determine, using the aligned LIDAR output, a distance to at least one object in the environment surrounding the host vehicle.

2. The navigational system of claim 1, wherein execution of the instructions included in the memory further causes the at least one processor to determine, using the distance to the at least one object, a speed of the host vehicle.

3. The navigational system of claim 1, wherein execution of the instructions included in the memory further causes the at least one processor to determine, using the aligned LIDAR output, an elevation of a road surface at a point where the at least one object contacts the road surface.

4. The navigational system of claim 1, wherein the at least one object includes another vehicle.

5. The navigational system of claim 1, wherein execution of the instructions included in the memory further causes the at least one processor to determine a road plane associated with a road on which the host vehicle travels.

6. The navigational system of claim 1, wherein execution of the instructions included in the memory further causes the at least one processor to:

determine a first plurality of points associated with at least a portion of a road identified in the at least one image; and interleave the first plurality of points with a second plurality of points derived from the aligned LIDAR output.

7. The navigational system of claim 1, wherein the determination of the at least one indicator of relative alignment between the output of the LIDAR and at least one image captured by the camera is performed periodically over time.

8. The navigational system of claim 1, wherein:

the at least one image captured by the camera comprises pixels;

the output of the LIDAR comprises at least one of a point cloud or a depth map; and the transform aligns at least one of the pixels with corresponding LIDAR reflection information in the point cloud or the depth map.

9. The navigational system of claim 1, wherein execution of the instructions included in the memory further causes the at least one processor to determine at least one navigational characteristic associated with the host vehicle, the at least one navigational characteristic being based on a correlation of depth or distance information of the output of the LIDAR with the at least one object.

10. The navigational system of claim 1, wherein the transform results in overlap of a first portion of the output of the LIDAR and a second portion of the at least one image, and wherein the first portion and the second portion are associated with a same lane marking.

11. A method of autonomously navigating a host vehicle, the method comprising:

receiving a stream of images captured by a camera onboard the host vehicle, wherein the captured images are representative of an environment surrounding the host vehicle;

receiving an output of a LIDAR onboard the host vehicle, wherein the output of the LIDAR is representative of a plurality of laser reflections from at least a portion of the environment surrounding the host vehicle;

determining at least one indicator of relative alignment between the output of the LIDAR and at least one image captured by the camera, wherein determining the at least one indicator of relative alignment comprises determining a transform between the at least one image captured by the camera and the output of the LIDAR;

aligning, in image space, the output of the LIDAR with the at least one image based on the determined at least one indicator of relative alignment; and determining, using the aligned LIDAR output, a distance to at least one object in the environment surrounding the host vehicle.

12. The method of claim 11, further comprising determining, using the distance to the at least one object, a speed of the host vehicle.

13. The method of claim 11, further comprising determining, using the aligned LIDAR output, an elevation of a road surface at a point where the at least one object contacts the road surface.

14. The method of claim 11, further comprising determining a road plane associated with a road on which the host vehicle travels.

15. The method of claim 11, further comprising:

determining a first plurality of points associated with at least a portion of a road identified in the at least one image; and interleaving the first plurality of points with a second plurality of points derived from the aligned LIDAR output.

16. The method of claim 11, wherein the determination of the at least one indicator of relative alignment between the output of the LIDAR and at least one image captured by the camera is performed periodically over time.

17. The method of claim 11, wherein:

the at least one image captured by the camera comprises pixels;

the output of the LIDAR comprises at least one of a point cloud or a depth map; and the transform aligns at least one of the pixels with corresponding LIDAR reflection information in the point cloud or the depth map.

18. The method of claim 11, further comprising determining at least one navigational characteristic associated with the host vehicle, the at least one navigational characteristic being based on a correlation of depth or distance information of the output of the LIDAR with the at least one object.

19. The method of claim 11, wherein the transform results in overlap of a first portion of the output of the LIDAR and a second portion of the at least one image, and wherein the first portion and the second portion are associated with a same lane marking.

20. A non-transitory computer readable medium containing instructions that when executed by at least one processor, cause the at least one processor to perform a method, the method comprising:

receiving a stream of images captured by a camera onboard a host vehicle, wherein the captured images are representative of an environment surrounding the host vehicle;

receiving an output of a LIDAR onboard the host vehicle, wherein the output of the LIDAR is representative of a plurality of laser reflections from at least a portion of the environment surrounding the host vehicle;

determining at least one indicator of relative alignment between the output of the LIDAR and at least one image captured by the camera, wherein determining the at least one indicator of relative alignment comprises determining a transform between the at least one image captured by the camera and the output of the LIDAR;

aligning, in image space, the output of the LIDAR with the at least one image based on the determined at least one indicator of relative alignment; and determining, using the aligned LIDAR output, a distance to at least one object in the environment surrounding the host vehicle.

21. The navigational system of claim 1, wherein execution of the instructions included in the memory further causes the at least one processor to determine, based on changes in distance information in the aligned LIDAR output over time, a rate at which the at least one object is approaching the host vehicle.

22. The non-transitory computer readable medium of claim 20, the method further comprising determining, using the aligned LIDAR output, an elevation of a road surface at a point where the at least one object contacts the road surface.

23. The non-transitory computer readable medium of claim 20, wherein:

the at least one image captured by the camera comprises pixels;

the output of the LIDAR comprises at least one of a point cloud or a depth map; and the transform aligns at least one of the pixels with corresponding LIDAR reflection information in the point cloud or the depth map.

24. The non-transitory computer readable medium of claim 20, the method further comprising determining at least one navigational characteristic associated with the host vehicle, the at least one navigational characteristic being based on a correlation of depth or distance information of the output of the LIDAR with the at least one object.

* * * * *